(12) United States Patent
Smith

(10) Patent No.: US 11,716,778 B2
(45) Date of Patent: *Aug. 1, 2023

(54) SYSTEM AND METHOD OF DETERMINING REAL-TIME LOCATION

(71) Applicants: DENSO International America, Inc., Southfield, MI (US); DENSO CORPORATION, Kariya (JP)

(72) Inventor: Eric John Smith, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,151

(22) Filed: Feb. 1, 2022

(65) Prior Publication Data

US 2022/0225450 A1 Jul. 14, 2022

Related U.S. Application Data

(63) Continuation of application No. 16/660,856, filed on Oct. 23, 2019, now Pat. No. 11,272,559.

(60) Provisional application No. 62/750,432, filed on Oct. 25, 2018.

(51) Int. Cl.
| | |
|---|---|
| H04W 4/00 | (2018.01) |
| H04W 76/15 | (2018.01) |
| H04W 84/18 | (2009.01) |
| H04W 4/029 | (2018.01) |

(52) U.S. Cl.
CPC ........... *H04W 76/15* (2018.02); *H04W 4/029* (2018.02); *H04W 84/18* (2013.01)

(58) Field of Classification Search
CPC ..... H04W 76/15; H04W 4/029; H04W 84/18; H04W 4/80; H04W 4/02
See application file for complete search history.

(56) References Cited

U.S. PATENT DOCUMENTS

| | | | |
|---|---|---|---|
| 9,794,753 B1 * | 10/2017 | Stitt | ........................ G06F 21/35 |
| 10,212,494 B1 | 2/2019 | Struhsaker et al. | |
| 2008/0307025 A1 * | 12/2008 | Licul | ..................... H04W 64/00 |
| | | | 708/308 |
| 2014/0368321 A1 | 12/2014 | Namgoong et al. | |

(Continued)

FOREIGN PATENT DOCUMENTS

| | | |
|---|---|---|
| JP | 2012-202734 | 10/2012 |
| WO | 2016/082754 | 6/2016 |
| WO | 2017/181050 | 10/2017 |

OTHER PUBLICATIONS

International Search Report and the Written Opinion of the International Searching Authority for International Application No. PCT/US2019/057553 dated Jan. 28, 2020, 7 pages.

*Primary Examiner* — Omoniyi Obayanju
(74) *Attorney, Agent, or Firm* — Warner Norcross + Judd LLP

(57) ABSTRACT

A system and method to determine location information with respect to a plurality of portable devices, with potentially a large number of portable devices such as 40 or more portable devices in proximity to the system. The system may connect to and locate each of the plurality of portable devices in proximity to the system. The location information may be determined with respect to an object, such as a vehicle or building, and optionally within a larger system of objects, such as a mass transit system.

18 Claims, 10 Drawing Sheets

(56) References Cited

U.S. PATENT DOCUMENTS

2015/0168543 A1  6/2015  Tian et al.
2018/0184268 A1  6/2018  Stitt et al.

* cited by examiner

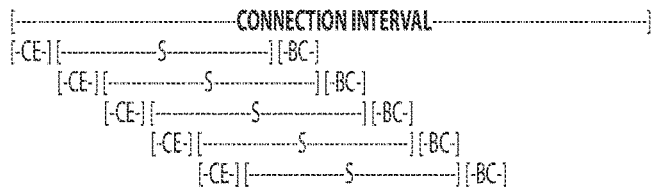
Fig. 10
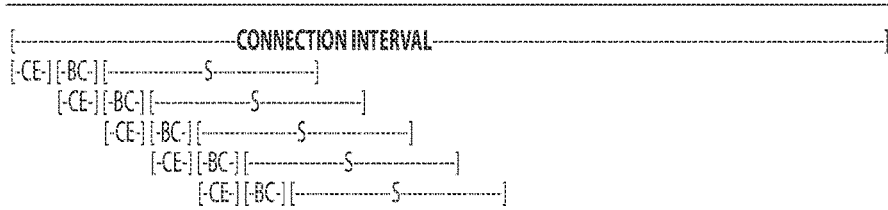
Fig. 11
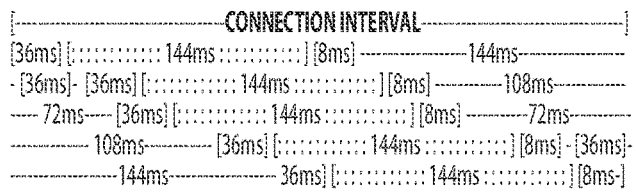
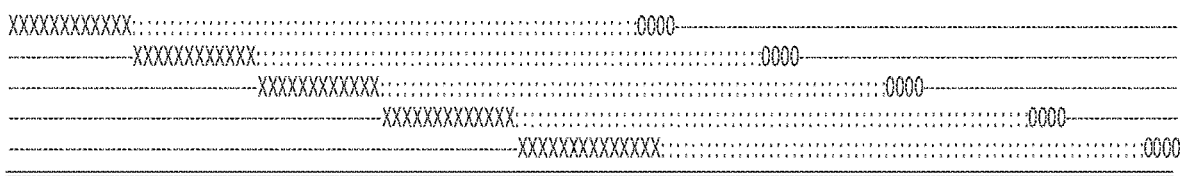
Fig. 12

```
[ ]:  COMMUNICATIONS WINDOW
 :::  SCANNING
 --:  IDLE TIME (RADIO OFF)

[-------------------------CONNECTION INTERVAL-------------------------]
[36ms] [::::::::::: 144ms :::::::::::] [8ms] ----------------32ms-----------------
-[36ms]-[36ms] [::::::::::: 116ms :::::::::] [8ms] -------------24ms-------------
----- 72ms ----- [36ms] [::::::::::: 88ms :::::::::] [8ms] -----------16ms-----------
-------------- 108ms ------------ [36ms] [::::::::: 60ms :::::::::] [8ms] - [36ms]-
----------------- 144ms ----------------- 36ms [:::::::::: 32ms :::::::::] [8ms-]

TO SCALE (2:1, X: PRIMARY, 0: AUXILARY):

XXXXXXXXXXXXXXXX:::::::::::::::::::::::::::::::::::::::::::::::::::::::::::::::::0000:::::::::::::::
:::::::::::::::::XXXXXXXXXXXXXXXX::::::::::::::::::::::::::::::::::::::::::::::::::::::0000:::::::::::::
::::::::::::::::::::::::::::::::XXXXXXXXXXXXXXXX:::::::::::::::::::::::::::::::::::::::::::::::0000::::::::
:::::::::::::::::::::::::::::::::::::::::::::XXXXXXXXXXXXXXXX::::::::::::::::::::::::::::::::::::::::0000::::
::::::::::::::::::::::::::::::::::::::::::::::::::::::::::::::XXXXXXXXXXXXXXXX:::::::::::::::::: 0000
```

Fig. 13

```
TO SCALE (2:1, X: PRIMARY, 0: AUXILARY):

XXXXXXXXXXXXXXXX0000::::::::::::::::::::::::::::::::::::::::::::::::::::::::::::::::::::::::::::::::
::::::::::::::::::XXXXXXXXXXXXXXXX0000:::::::::::::::::::::::::::::::::::::::::::::::::::::::::::::::::
::::::::::::::::::::::::::::::::::XXXXXXXXXXXXXXXX0000::::::::::::::::::::::::::::::::::::::::::::::::
::::::::::::::::::::::::::::::::::::::::::::::::::XXXXXXXXXXXXXXXX0000:::::::::::::::::::::::::::::::
::::::::::::::::::::::::::::::::::::::::::::::::::::::::::::::::::XXXXXXXXXXXXXXXX0000
```

Fig. 14

```
[ ]:    COMMUNICATIONS WINDOW
:::     SCANNING
-:      IDLE TIME (RADIO OFF)

[--------- CONN. INTERVAL ---------]
[32ms] [1ms] [:::::: 144ms ::::::]
:32ms: [32ms]  [1ms-]  :32ms:
:::::: 144ms :::::: [32ms]  [1ms-]

TO SCALE (2:1, X: PRIMARY, O: AUXILARY):

XXXXXXXXXXXXXXXO::::::::::::::::::::::::::::::::::
:::::::::::::::::::::::::XXXXXXXXXXXXXXXO:::::::::::::::::
::::::::::::::::::::::::::::::::::::::::XXXXXXXXXXXXXXXO
```

Fig. 15

```
[ ]:    COMMUNICATIONS WINDOW
:::     SCANNING
-:      IDLE TIME (RADIO OFF)

[--CONN. INTERVAL--]
[-CE-]  [-S-]  [-BC-]
[-CE-]  [-S-]  [-BC-]
[-CE-]  [-S-]  [-BC-]

[32ms] :: 17ms :: [1ms-]
[32ms] :: 17ms :: [1ms-]
[32ms] :: 17ms :: [1ms-]

TO SCALE (2:1, X/Y/Z: PRIMARY, A/B/C: AUXILARY):

XXXXXXXXXXXXXXX:::::::::::::::A
YYYYYYYYYYYYYYY:::::::::::::::B
ZZZZZZZZZZZZZZZ:::::::::::::::C
```

Fig. 16

[ ]: COMMUNICATIONS WINDOW
::: SCANNING
--: IDLE TIME (RADIO OFF)

[-------- CONN. INTERVAL --------]
[-CE-] [-BC-] ::::::::::::::::
[-CE-] -------- [-BC-] ::::::::
:::::: [--------CE--------] [-BC-]

TO SCALE (2:1, X/Y/Z : PRIMARY, A/B/C : AUXILARY) :

XXXXXXXXXXXXXXXA::::::::::::::::::::
YYYYYYYYYYYYYYY - B::::::::::::::::::
::::::::::::::::ZZZZZZZZZZZZZZZZC

Fig. 17

[ ]: COMMUNICATIONS WINDOW
::: SCANNING
--: IDLE TIME (RADIO OFF)

[------------ CONN. INTERVAL ------------]
[-CE-] [-S-] [-BC-]
[-CE-] [-S-] -------- [-BC-]
[-CE-] [-S-] ---------------- [-BC-]

TO SCALE (2:1, X/Y/Z : PRIMARY, A/B/C : AUXILARY) :

XXXXXXXXXXXXXXX::::::::::::::A---
YYYYYYYYYYYYYYY::::::::::::::B--
ZZZZZZZZZZZZZZZ::::::::::::::C

Fig. 18

SYSTEM AND METHOD OF DETERMINING REAL-TIME LOCATION

FIELD OF THE INVENTION

The present disclosure relates a system and method for determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS in the automotive realm includes a transceiver or master controller located within a vehicle and capable of communicating via radio frequency (RF) with a portable device. Such systems are often focused on a handful of devices being associated with a vehicle, and determining locations of said devices relative to the vehicle, with high accuracy and with very fast response time, if they are present in proximity to the vehicle. As a result, such a conventional RTLS is not configured to scale to support a significant number of devices, such as more than 10 devices, often leading to incorrect localization, inability to localize, or poor response time with respect to devices if present.

SUMMARY

A system and method are provided to determine location information with respect to a plurality of portable devices, potentially a large number of portable devices, such as 40 or more portable devices, in proximity to the system. The system may connect to and locate each of the plurality of portable devices in proximity to the system. The location information may be determined with respect to an object, such as a vehicle or building, and optionally within a larger system of objects, such as a mass transit system.

In one embodiment, a system is provided obtaining sensor information to locate a plurality of portable devices. The system may include a first controller device operable to communicate with a first portable device via a first communication channel of a first communication link, where the plurality of portable devices includes the first portable device. The system may also include a second controller device operable to communicate with a second portable device via a second communication channel over a second communication link, where the plurality of portable devices includes the second portable device.

A communication supervisor may be provided that is configured to direct the first controller device and the second controller device to communicate via the first communication link and the second communication link, such that simultaneous communications over the first communication link and the second communication link occur over different channels and/or at different times within the same channel. The system may also include a plurality of sensor devices, each sensor device of said plurality of sensor devices configured to obtain a sensed characteristic with respect to communications transmitted via the first communication link and the second communication link.

In one embodiment, a system may be provided for obtaining sensor information to locate a plurality of portable devices. The system may include a first controller device operable to communicate with a first portable device via a first communication channel of a first communication link, and a second controller device operable to communicate with a second portable device via a second channel over a second communication link.

The system may also include a communication supervisor configured to direct the first controller device and the second controller device to communicate via the first communication link and the second communication link, and a plurality of sensor devices, each of the plurality of sensor devices configured to obtain a sensed characteristic with respect to communications transmitted via the first communication link and the second communication link. The system may include a locator operable to determine location information about the first portable device based on a sensed characteristic obtained with respect to communications transmitted via the first communication link, where the locator is operable to determine location information about the second portable device based on the sensed characteristic obtained with respect to communications transmitted via the second communication link.

A method of determining a location with respect to a plurality of portable devices may be provided in accordance with one embodiment. The method may include communicating between a first controller device and a first portable device via a first communication channel of a first communication link, where the plurality of portable devices includes the first portable device. The method may also include communicating between a second controller device and a second portable device via a second communication channel of a second communication link, where the plurality of portable devices includes the second portable device.

A plurality of sensor devices may be directed to obtain a sensed characteristic of communications transmitted via the first communication link and the second communication link. A first location of the first portable device may be determined based on a sensed characteristic of communications obtained with respect to the first communication link, and a second location of the second portable device may be determined based on a sensed characteristic of communications obtained with respect to the second communication link.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 10 is a timing diagram of communications in accordance with one embodiment.

FIG. 11 is a timing diagram of communications in accordance with one embodiment.

FIG. 12 is a timing diagram of communications in accordance with one embodiment.

FIG. 13 is a timing diagram of communications in accordance with one embodiment.

FIG. 14 is a timing diagram of communications in accordance with one embodiment.

FIG. 15 is a timing diagram of communications in accordance with one embodiment.

FIG. 16 is a timing diagram of communications in accordance with one embodiment.

FIG. 17 is a timing diagram of communications in accordance with one embodiment.

FIG. 18 is a timing diagram of communications in accordance with one embodiment.

DETAILED DESCRIPTION

Figure 1:
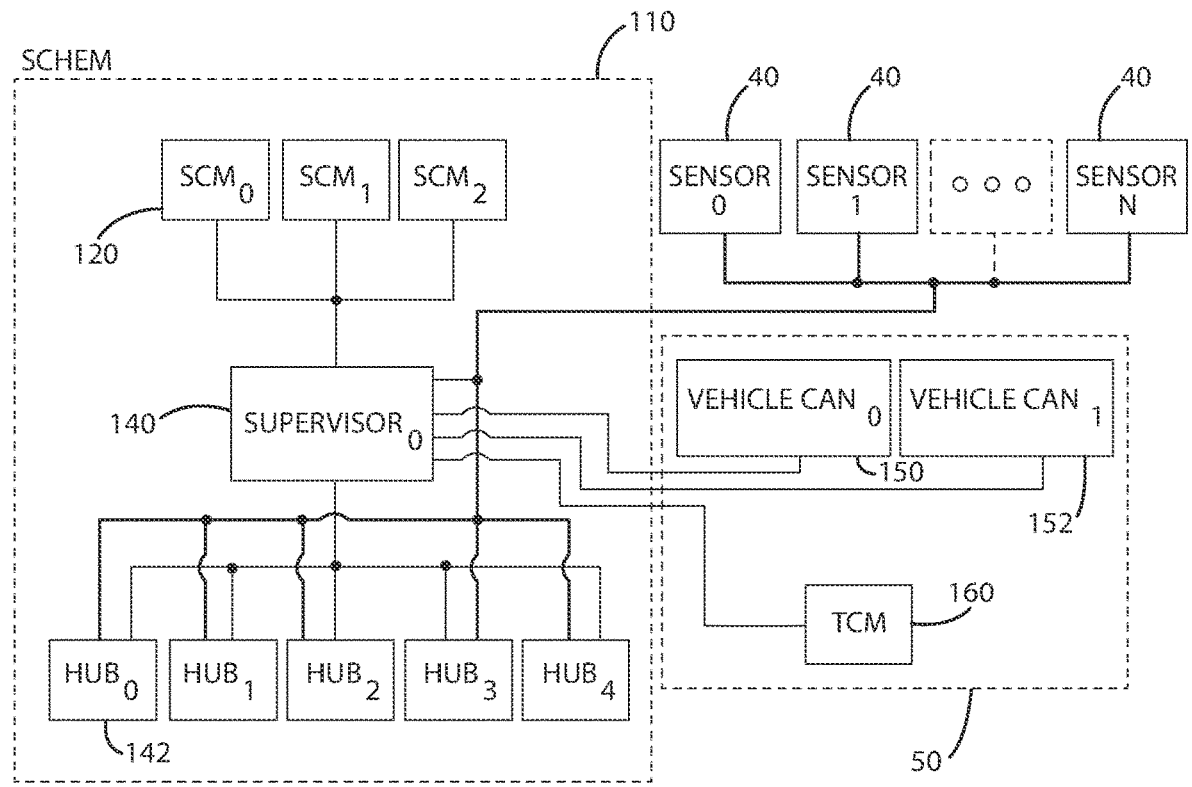
FIG. 1 shows a system in accordance with one embodiment.

A system and method according to one embodiment are provided to determine location information with respect to a plurality of portable devices, potentially a large number of portable devices, such as 40 portable devices, in proximity to the system. The system may connect to and locate each of the plurality of portable devices in proximity to the system. The location information may be determined with respect to an object, such as a vehicle or building. The portable device may be any type of device worn or carried by a user, including a smartphone with iOS or Android systems, as well as other non-phone (custom) devices, such as fobs, watches, and bracelets.

The system and method in one embodiment may be provided for determining location information about a plurality of portable devices in a mass transit system, including one or more vehicles capable of transporting large numbers of passengers at a time (e.g., a bus or train). The system and method in one embodiment in a mass transit system may provide one or more of the following features, which facilitate user experience:

1) Locate and connect to all, or nearly all, passengers/drivers that may be on- or off-boarding at any given stop.
2) Continue to locate all, or nearly all, passengers/drivers with a full passenger load in busy (city) environments.
3) Authenticate users without an Internet connection (without requiring the user to do things differently).
4) Operate in the background with little or no outward presence with respect to the users.
5) Responsiveness—the system may be configured to perform all, or nearly all, actions for all, or nearly all, portable devices without diminishing the user experience.

A "user" as described herein may be a "driver" or a "passenger" or a "potential passenger" or "another device that presents information to passengers" (e.g., a vehicle-mounted display or other device that has an identity).

1. Locate and Connect to all, or Nearly all, Passengers/Drivers that May be On- or Off-Boarding at any Given Stop.

The system and method in one embodiment may facilitate determining location information about a plurality of portable devices in a variety of environments, including ride-sharing environments, rental environments, taxi environments, and autonomous vehicle environments. These types of environments may provide one or more transit systems for facilitating transportation of each user from one point to another, where all of the users may not enter or exit at the same point.

In one embodiment, a vehicle of the transit system can hold 9-14 passengers, plus a driver (10-15 users 60). A new driver and many passengers may be waiting to board at any given stop (10-15 users 60). The system 100 in the illustrated embodiment of FIG. 7 may be configured to determine location information about each of the users 60. Additionally, there may be other things in the vehicle with a connection or identity (screens, etc.). This combination of users 60 and connections may yield 10+10+2 to 15+15+4, or 22 to 34 connections, with the +2 and +4 being indicative of the other things in the vehicle with a connection or identity.

Figure 7:
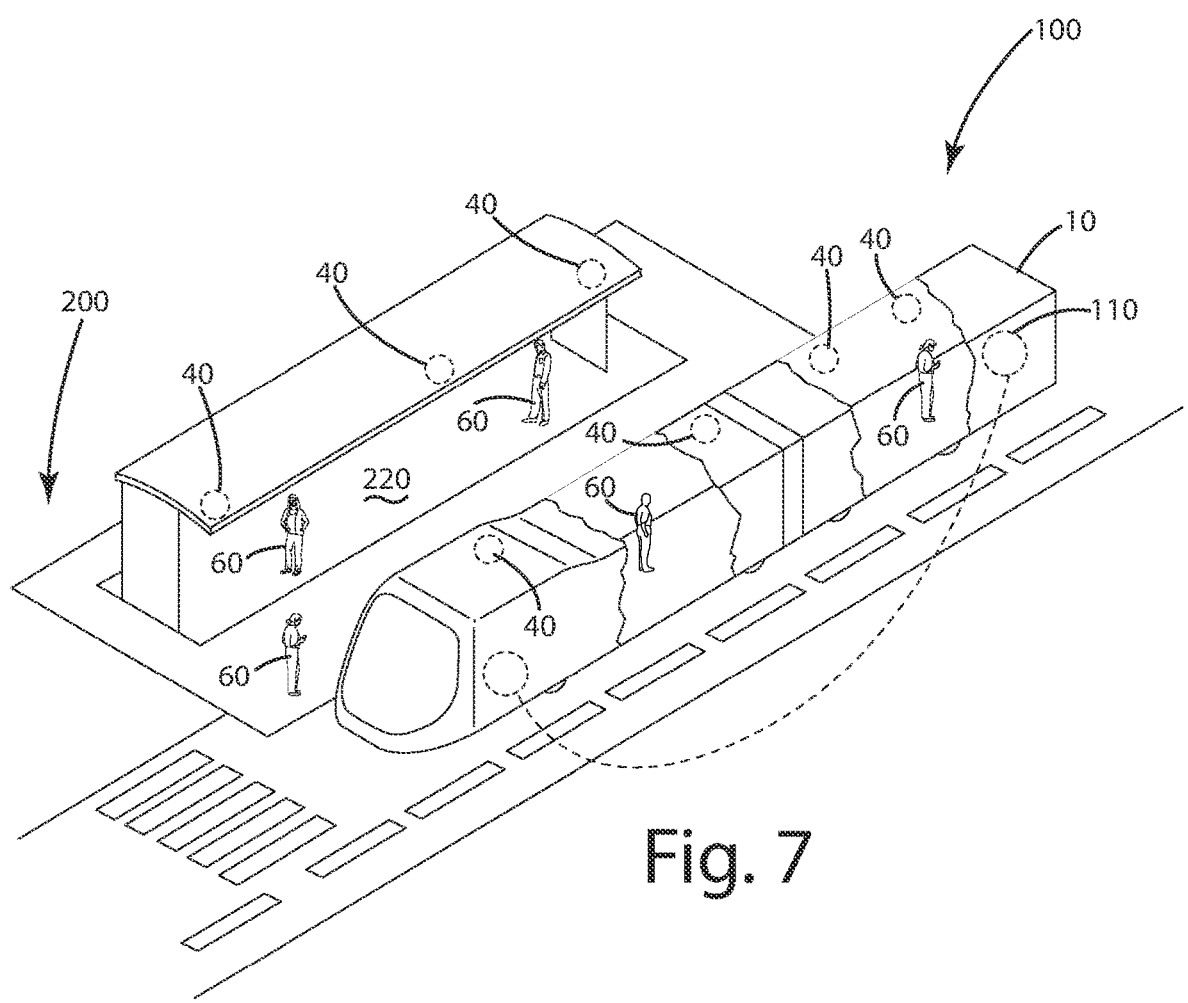
FIG. 7 depicts an aspect of a mass transit system with the system of FIG. 1 in accordance with one embodiment of the present disclosure.

A portion of a mass transit environment or system is shown in FIG. 7 and generally designated 200, including an object 10 embodied as a bus and a boarding platform 220. The illustrated embodiment includes a) a plurality of users designated 60, each carrying a portable device 20, and b) a system in accordance with an embodiment of the present disclosure designated 100. It is noted that the transit system 200 is not limited to type shown in the illustrated embodiment; the transit system 200 may be any type of transportation system, including a ridesharing van or autonomous taxi. In these examples, it is noted that the boarding platform 220 may be any designated pickup location, such as a curb or someone's driveway.

City busses often carry 60-80 passengers, trains can carry 50-100 passengers (seated) or around 260 passengers (seated plus standing, NYC subway). In China, Japan, and India, trains may potentially carry many more users (400, both inside and outside of the cabin, for example). A system 100 configured for use in connection with a mass transit system therefore may be specified to support up to 400 passengers per cabin (already on board) plus users 60 potentially waiting to on-board (up to 800 users 60 plus 1-10 staff per cabin). It is a similar case for large lobbies of office buildings where hundreds of people may be detected by or connected to the system 100 simultaneously awaiting entry or services.

Based on the parameters discussed above, the system 100 in accordance with one embodiment may support between 20 and 40 connections, and may be scaled to support substantially more connections.

2. Continue to Locate all, or Nearly all, Passengers/Drivers with a Full Passenger Load in a Busy (City) Environment.

It is noted that with a large number of portable devices 20 and users 60 (e.g., possibly 40), there is likely to be many bodies to block wireless signals (e.g., BLE signals, UWB, or Wifi, or a combination thereof) between the portable device 20 and sensors 40 disposed on the object 10.

A system 100 in one embodiment may include 11 sensors 40 (one rear pair, one passenger side middle pair, one driver side middle pair, one passenger side front pair, one driver side front pair, and one center sensor [center console/stack]), and has been demonstrated empirically to be reliable with four simultaneous users 60 regardless of their position.

There is a chance there is some vulnerability to mis-localization as the number of users 60 increases, such as with 15 people inside and absorbers (bodies)/reflectors (vehicles, buildings) outside. A system 100 with additional sensors 40 may be configured to avoid such mis-localizations.

A system 100 in one embodiment includes an additional pair of rear sensors 40 (to ensure that blockage of a single sensor 40 does not disrupt the system's ability to determine inside/outside at the rear), an additional pair of driver and passenger side sensors 40 near the back (to provide better inside/outside coverage at the rear sides of the vehicle), and two additional sensors 40 in the headliner (one in the rear and one at the vehicle middle, to help provide coverage for people in the center of the vehicle at the middle/rear when the vehicle is full, i.e., people are seated on the sides). This would be a 19-sensor configuration.

There exist configurations with fewer than 19 sensors: 13 (11+additional rear pair), 15 (11+additional driver and passenger back pairs), 17 (11+additional rear pair and additional driver and passenger back pairs), or similar combinations with or without the rear/back pairs, but instead, one or more of the additional center (headliner) sensors.

Alternatively, to reduce cost at the expense of accuracy, the system may be run in a seven sensor configuration, or a less than seven sensor configuration, including a single sensor configuration.

3. Authenticate Users without an Internet Connection (without Requiring the User to do Things Differently).

In one embodiment, similar to the illustrated embodiment of FIG. 1, the system 100 may be a BLE microlocation system, with a control system 110 (described in one embodiment as a SCHEM 110, but not so limited) including an SCM 120 and a hub 142. The SCM 120 and hub 142 may be electronic system components 70 configured to operate in accordance with one or more embodiments described herein. The SCM 120 may provide an advertisement to which the portable device 20 connects initially, allowing the portable device 20 to operate in a background scanning central mode. When a portable device 20 connects to the SCM 120, the SCM 120 or portable device 20 determine how (e.g., what UUID to use, as well as potentially other security or connection information) and possibly when the portable device 20 should advertise, and then the SCM 120 passes that information to the hub 142. The SCM 120 or the portable device 20 may then either maintain this "initial connection" (in case the microlocation connection phase fails), drop it after some pre-determined or dynamically determined period of time, or drop it immediately.

In one embodiment, the SCM 120 or the portable device 20 may continue to use the initial connection for microlocation and/or communications. In this case, the role-switch may not be conducted. More specifically, in one embodiment, the portable device 20 may remain in the central role, and microlocation may be conducted with the portable device 20 in that role. Additionally, or alternatively, a data connection may be maintained with the portable device 20 in the central role. It is further noted that functionality described in conjunction with the SCM 120 and hub 142 may be absent from either of these components or incorporated into another component. Any combination of functionality of the described components may be utilized in a device in accordance with one embodiment of the present disclosure. For example, all or a subset of functionality described in conjunction with the SCM 120 and the hub 142 may be combined into a single device.

Using the provided information, the hub 142 may then scan for the portable device 20 and connect to it. At this point, the portable device 20 and hub 142 may exchange information to complete the connection process and/or complete any other authentication and/or security protocols, and the connection is maintained. It is by using this connection that the control system 110 (hub 142) may localize the portable device 20 and through which the portable device 20 communicates with the control system 110 to issue or receive commands to/from the vehicle or other systems or aspects of the object 10.

It is noted that the system 100 may be configured such that the SCM 120 is absent or replaced with another system component, e.g., where the hub 142 scans for a portable device 20 obtained via the other system component either dynamically or predetermined.

The identity of each portable device 20 that connects to the system 100 in one embodiment may be required to be authenticated prior to being used/trusted (e.g., when the connection is established, prior to reporting the portable device 20 is connected to another system, etc.).

Alternatively, or additionally, the identity of the user 60 possessing each portable device 20 in one embodiment may be required to be authenticated prior to being used/trusted (e.g., when the connection is established, prior to reporting the portable device 20 is connected to another system, etc.).

Authentication may occur on the SCM 120 (before the SCM 120 informs the hub 142 of the portable device 20) or on the hub 142 (e.g., after the hub 142 has connected to the portable device 20, but before the portable device 20 is reported as connected to other systems). In one embodiment, the phone may be reported as connected but not authenticated.

Authentication by the portable device 20 or user 60 may occur with or without an Internet connection.

The authentication protocol may vary from application to application. Example protocols include certificate verification (e.g., a conventional digital key), symmetric key, and identity-based access management (IAM) described in U.S. patent application Ser. No. 15/796,180, entitled SYSTEM AND METHOD FOR AUTHENTICATING AND AUTHORIZING DEVICES, filed Oct. 27, 2017, to Smith et al. In one embodiment, authentication stages may be split between the SCM 120 and the hub 142.

Additionally, or alternately, parts of the security model and/or authentication stages may be split between other microprocessors and/or modules of the control system 110, sensors 40, the system 100, or even external systems. For example, the control system 110 may have additional processors (e.g., an "Application" or "Core" processor, perhaps referred to as a supervisor as described herein), which itself may be coupled to or incorporate a secure element or hardware security module. The supervisor may provide security services for use by the SCM 120 and/or the hub 142, or may perform security operations on behalf of one or both of the SCM 120 and the hub 142.

4. Background Operation.

The system 100 in one embodiment may be operable to work fully in the background, which for purposes of disclosure means that the system 100 may be capable of causing the portable device 20 of the user 60 (e.g. the user's phone) to start an app or service when the portable device 20 is near the system 100 and locked (screen off) without any user interaction. This implies that the vehicle or object 10, at least at some point, may operate as an advertising device, e.g., a "beacon"—although it should be understood that the vehicle or object 10 may not operate in this manner. In alternative embodiments, the portable device 20 may advertise and the system 100 may scan for those advertisements; however, these systems 100 may involve the user 60, at least at some point, starting an application on the portable device 20 and having the application continue to run in the background (usually advertising continuously). It should be understood that the present disclosure is not limited to a particular background operational aspect; additionally, one or more embodiments herein may not be configured for background operation.

5. Responsiveness—the System May be Configured to Perform all, or Nearly all, Actions for all, or Nearly all, Portable Devices without Diminishing the User Experience.

The term "BLE module" (or "BLE chip" or "BLE SoC") and "BLE radio" may be used interchangeably in this disclosure. A BLE module 42 may include at least a microprocessor and a BLE transceiver (a BLE radio), and thus the disclosure may occasionally refer to a BLE module 42 as a BLE radio, or conversely, a BLE radio as a BLE module 42. It is also possible for a microprocessor or BLE module 42 to have multiple BLE radios (i.e., multiple BLE transceivers). For example, in several embodiments a number of separate BLE radios and/or BLE modules 42 are described. In such embodiments, the separate BLE radios and/or BLE modules 42 may actually be separate BLE modules 42 (i.e., separate microprocessors, each with their own BLE transceivers), separate BLE radios (i.e., BLE transceivers) connected to one or more microprocessor (e.g., a supervisor, one BLE module 42 with multiple BLE transceivers, etc.), or any combination thereof.

The system 100, in one embodiment, may perform all actions for all portable devices 20 (e.g., phones) without diminishing the user's experience. The responsiveness and accuracy of the system 100 may not be affected—or noticeably affected—at the extremes of the number of supported portable devices 20 and/or sensors 40.

Alternatively, the system 100 in one embodiment may be configured to avoid simply reducing the speed at which the system 100 operates to support additional portable devices 20 and/or sensors 40. It is noted that otherwise, using such a reduction, the responsiveness and localization accuracy of the system 100 may decrease, possibly continually, as the number of portable device 20 and sensors 40 increases.

In one embodiment with BLE, support for additional portable devices 20 and/or sensors 40 may be enabled via one or more of the following:
1) Making a connection interval longer, so that more connection events (devices) can fit into the interval, scan for advertising devices (new connections) longer, or if using the same radio to send signal characteristics, send data for more sensors. This may allow the system 100 to support more portable devices 20 and/or sensors 40, at the expense of throughput (i.e., it may slow down the entire system 100).
2) Increasing the bandwidth of the connection from 1 mbps to 2 mbps. This may enable the system 100 to send more data in the same amount of time, at the expense of communications quality (i.e., the system 100 may be more susceptible to noise, and thus, may drop more data).
3) Reducing the time for each connection event (reducing the number of packets that a portable device 20 may send to/from the system 100 per connection event).
4) If using the same radio to send signal characteristics, reduce the amount of data sent for each portable device 20 and/or sensor 40 (if possible).
5) Reduce the maximum number of supported portable devices 20 and/or sensors 40 (reducing the amount of time and/or bandwidth required).

The system 100 in one embodiment may utilize frequency-hopping communication mediums/protocols (such as BLE) to keep the same (or nearly the same) responsiveness as a system that supports a small number of portable devices 20 and sensors 40. The system 100 in one embodiment may support many more portable devices 20 and sensors 40 by parallelizing operations with multiple frequencies (e.g., operating on multiple frequencies at the same time), in addition to or alternative to one or more of the methods mentioned above. As mentioned herein, the portable devices 20 and sensors 40 may utilize one or more wireless communication interfaces, including BLE and UWB. It is noted that in any case where BLE is mentioned, the present disclosure is not so limited and UWB or another type of communication interface may be used in addition to or alternative to BLE.

In one embodiment, the system 100 may be configured where some UWB anchors operate on one frequency and others on another frequency to help manage the case where lots of phones are present in the same area and ranging at the same time.

In one embodiment, a transceiver (wireless or wired, referred to as a "radio") may be incapable of being powered up/down, changing frequencies, and/or sending/receiving data infinitely fast. The transceiver may also be incapable of sending/receiving data on more than one frequency at any given time. Additionally or alternatively, a portable device 20 and/or a sensor 40 may not always send/receive at different times, despite being designed to do so, for a variety of reasons including misbehaving software (resets or operating system induced delays), clock skew, RF reflections, and so on. As a result, parallelization in one embodiment of the present disclosure may be achieved with multiple radios (which may be connected to a single antenna, multiple antennas, or even one or more antennas per radio). Each radio may be connected to one microprocessor (with its own compute resources) or each microprocessor may be connected to multiple radios. The system 100 may use multiple BLE chips (or alternatively or additionally UWB chips or another type of wireless communication interface) instead of just one and then coordinate the activities of those chips, so that their behavior is transparent to the rest of the system 100 and its users 60. With a system configured this way, the system 100 may be scaled to any number of connections, provided that the communication medium's bandwidth limits are not exceeded (e.g., the BLE spectrum is not saturated by supporting huge numbers of portable devices 20 and sensors 40 at a high rate).

I. System Overview

Figure 8:
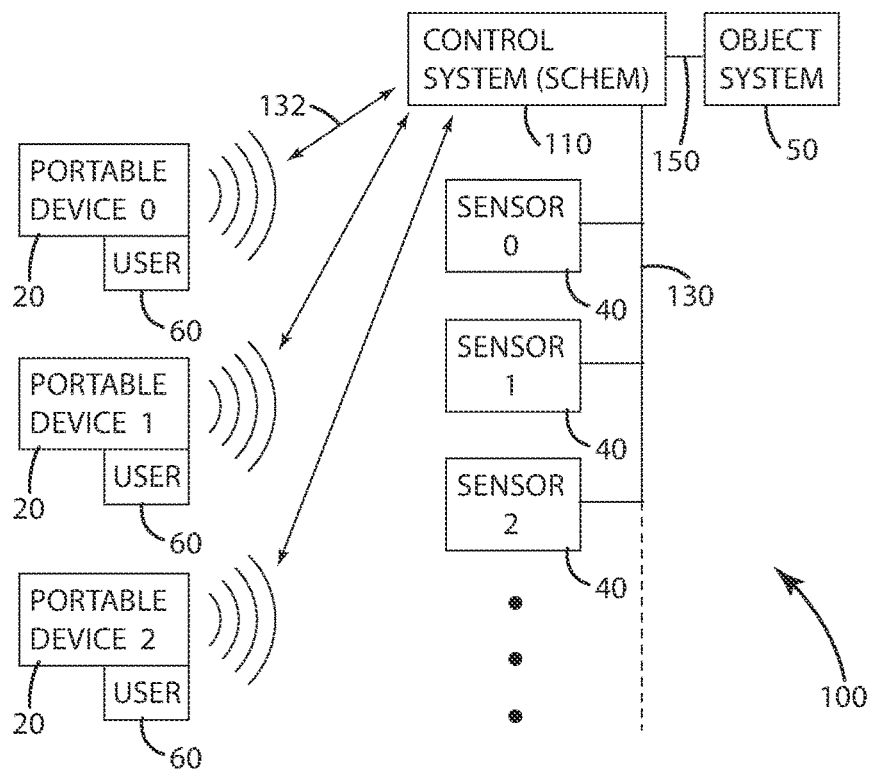
FIG. 8 shows a system in accordance with one embodiment of the present disclosure.

A system in accordance with one embodiment is shown in the illustrated embodiment of FIGS. 1, 7 and 8 and generally designated 100. The system 100 may include one or more system components as outlined herein. A system component may be a user 60 or an electronic system component 70 shown in the illustrated embodiment of FIG. 9, which may be the portable device 20, a sensor 40, or an object device part of an object system 50, or a component including one or more aspects of these devices. The underlying components of the electronic system component 70, as discussed herein, may be configured to operate in conjunction with any one or more of these devices. In this sense, in one embodiment, there may be several aspects or features common among the portable device 20, the sensor 40, the object device, the hub 142, and the SCM 120, as well as other components of the system 100 described herein.

For instance, one or more features described in connection with electronic system component 70 depicted in FIG. 9 may form part of an object device of the object system 50, a portable device 20, SCM 120, hub 142, or the sensor 40, or any combination thereof. In one embodiment, an object device or a component of the control system 110 may include the same or similar components described in conjunction with electronic system component 70 in the illustrated embodiment of FIG. 9, and may form an equipment component disposed on an object 10, such as a vehicle or a building.

An object device in the form of an electronic system component 70 may be communicatively coupled to one or more systems of the object 10, collectively forming an object system 50 to control operation of the object 10. Information may be communicated among components of the object system 50, including transmitted and received between two or more components of the object 10.

As mentioned herein, the object system 50 may include communication capabilities. The object 10 may include one or more communication networks, wired or wireless, that facilitate such communication, such as multiple wired busses 150, 152 shown in the illustrated embodiment of FIG. 1. The communication network may also enable one or more electronic system components 70, internal or external to the object system 50, to communicate with the object system 50. For instance, the communication network may facilitate communication between a control system 110 (including one more electronic system components as described herein) and the object system 50. Such a communication network may be a CAN bus and is designated 150 in the illustrated embodiment of FIG. 8 and shown as the first and second vehicle busses 150, 152 in the illustrated embodiment of FIG. 1. Additionally, or alternatively, the control system 110 may communicate directly with one or more object devices of the object system 50 via a dedicated communication link. For instance, the control system 110 in the illustrated embodiment of FIG. 1 is configured to communicate directly with an object device embodied as a telematics control unit 160, as described herein.

As mentioned above, in the illustrated embodiment of FIG. 1, the object system 50 may include a telematics control unit (TCU) 160. For instance, the TCU 160 may be connected to the control system 110 via a communication link, such as an SPI link. In another embodiment, the TCU 160 may be combined with the control system 110. In another embodiment, the TCU 160 may be part of a component of the object system 50, or connected to a component of the object system 50 through which the control system 110 may communicate with the TCU 160.

In another embodiment, the TCU 160 may be absent and data that would have been provided by the TCU 160 may be tunneled through the portable device 20 (e.g., via BLE). "Tunneled" may be defined as a traditional tunnel—like running TCP/IP over BLE; however, the present disclosure is not so limited. The tunnel may be defined as a configuration that enables relevant data to be communicated to the object system 50 or other system components via commands/responses.

In one embodiment, the TCU 160 may include a cellular modem or other long range WAN radio (Lora, Sigfox, etc.).

In one embodiment, as described above, the TCU 160 is not a required part of the system; for instance, all functionality of the TCU 160 and the system it communicates with may be performed locally (e.g., not in the cloud).

II. Electronic System Component

Figure 9:
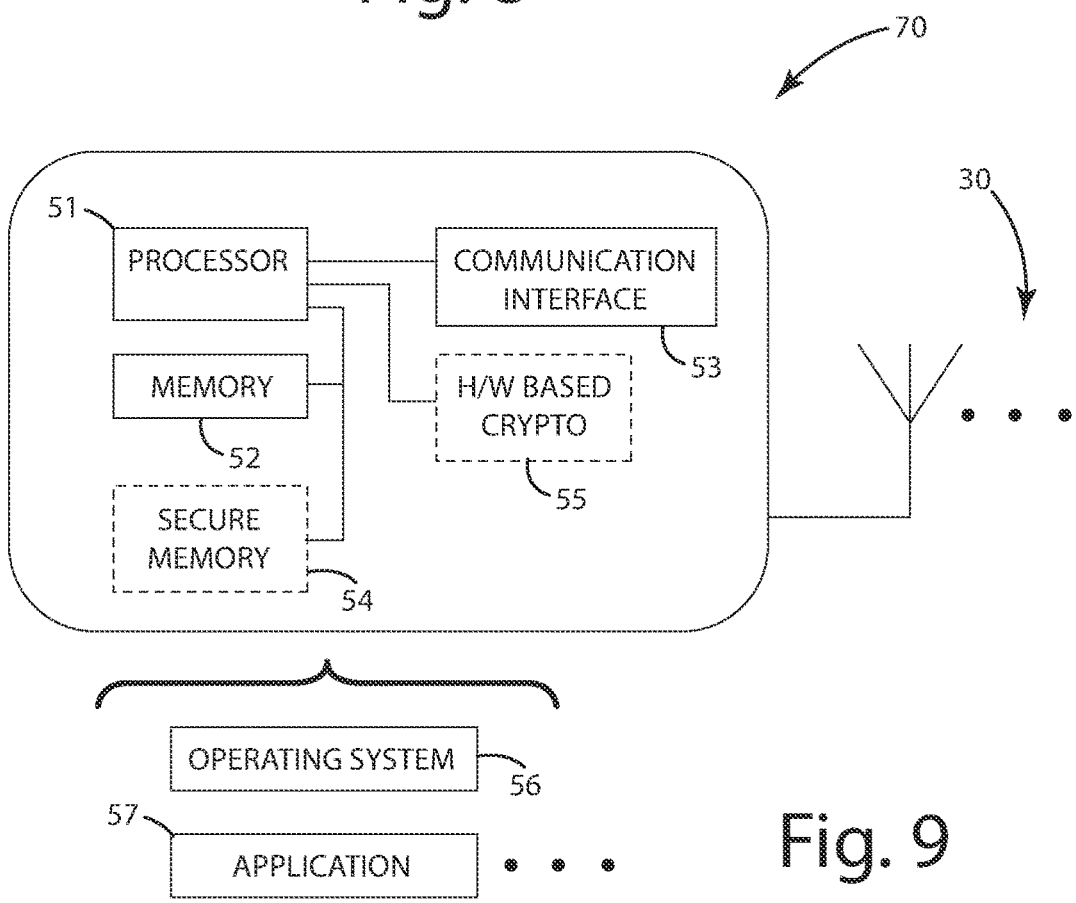
FIG. 9 shows an electronic system component in accordance with one embodiment of the present disclosure.

In the illustrated embodiment of FIG. 9, the electronic system component 70 is provided with a controller 51 configured to control operation of the electronic system component 70 in accordance with the one or more functions and algorithms discussed herein, or aspects thereof. It is noted that the components and configurations described herein in conjunction with the electronic system component 70 may be embodied in any of the system components, such as a component of the object system 50, the SCM 120, the hub 142, the sensor 40, the portable device 20 or any combination thereof, which may similarly include a controller 58 configured to control operation or aspects of the respective system component.

The controller 58 includes any and all electrical circuitry and components to carry out the functions and algorithms described herein. Generally speaking, the controller 58 may include one or more microcontrollers, microprocessors, and/ or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/ or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the electronic system component 70, or they may reside in a common location within the electronic system component 70. When physically distributed, the components may communicate using any suitable serial or parallel communication protocol, such as, but not limited to: CAN, LIN, FireWire, I2C, RS-232, RS-422, RS-485, SPI, Ethernet, Universal Serial Bus (USB), or RF (cellular, WiFi, Bluetooth, Bluetooth Low Energy).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator. It is noted that the controller 58 may form part of the SCM 120 or another electronic system component, which may incorporate the model or locator to determine location information with respect to a portable device 20.

The controller 58 of the electronic system component 70 in the illustrated embodiment of FIG. 9 may include one or more processors 51 that execute one or more applications 57 (software and/or includes firmware), one or more memory units 52 (e.g., RAM and/or ROM), and one or more communication interfaces 53, amongst other electronic hardware. The portable device 20 may or may not have an operating system 56 that controls access to lower-level devices/electronics via a communication interface 53. The electronic system component 70 may or may not have hardware-based cryptography units 55—in their absence, cryptographic functions may be performed in software. The electronic system component 70 may or may not have (or have access to) a secure memory unit 54 (e.g., a secure element or a hardware security module (HSM)). Optional components and communication paths are shown in phantom lines in the illustrated embodiment.

The controller 58 in the illustrated embodiment of FIG. 9 is not dependent upon the presence of a secure memory unit 54 in any component. In the optional absence of a secure memory unit 54, data that may otherwise be stored in the secure memory unit 54 (e.g., private and/or secret keys) may be encrypted at rest, when possible. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may be any type of communication link, including any of the types of communication links describe herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including BLE or UWB communications, or a combination thereof. The communication interface 53 may provide multiple communication links in one embodiment.

As another example, the communication interface 53 may provide a wireless communication link with another system component such as a component of the control system 110, such as wireless communications according to the WiFi standard. In another example, the communication interface 53 may be configured to communicate with an object system 50 or a component thereof of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the electronic system component 70 may be configured to communicate with one or more auxiliary devices other than components of the object system 50, the control system 110, or a user 60. The auxiliary device may be configured differently from the electronic system component 70—e.g., the auxiliary device may not include a processor 51, and instead may include at least one direct connection and/or an auxiliary device communication interface 53 for transmission or receipt, or both, of information with the electronic system component 70. For instance, the auxiliary device may be a solenoid that accepts an input from the electronic system component 70, or the auxiliary device may be a sensor (e.g., a proximity sensor) that provides analog and/or digital feedback to the electronic system component 70.

III. System Configurations

In one embodiment, the system 100 may support a large number of passive BLE devices (e.g., phones, key fobs, etc.) with a large number of sensors 40 (or fewer sensors 40 that may report more information) in a way that reasonable system performance, as experienced by all users, is delivered. As discussed herein, it is to be understood that the present disclosure is not limited to BLE devices. The BLE devices described herein may alternatively be UWB devices, or another type of wirelessly configured device. It is also to be understood that the devices may include more than one type of wireless capability, such as both BLE and UWB capabilities.

In one embodiment, a system that supports 40 or more devices with 24 or more sensors 40 is provided, wherein the system 100 is able to connect to, authenticate, and accurately localize a user's device before (or at nearly the same time as) the user 60 performs an action dependent upon said device's connection, identity, localization, and/or any other attribute and/or interaction (e.g., authenticating the user 60 or their portable device 20 prior to reaching the object [vehicle], allowing a vehicle door to unlock prior to its door handle being pulled on rapid approach, etc.). Generally, accuracy and responsiveness increase with smaller connection intervals (it should be noted that other connection parameters may also affect accuracy and responsiveness); therefore, a connection interval of around 50 ms is targeted, preferring 100 ms or less. However, larger connection intervals may be tolerated, depending upon system requirements and the delivered user experience. These localization techniques, as discussed herein, may be conducted based on BLE communications; however, the localization technique may be based on additional or alternative types of communications, including UWB.

A. SCHEM

Current automotive qualified BLE chips generally support up to eight devices per central role. There are several non-automotive-qualified BLE chips that support 20 or more connections (at what connection interval is unclear). It is assumed that automotive qualified chips are desired. BLE Time-of-Flight (ToF) and BLE Angle of Arrival (AoA) support is also desired. Therefore, it may be assumed that up to eight connections per hub 142 may be supported, using five hubs 142 to support 40 connections. It is noted that any specification to maintain a persistent "anchor" connection may be eliminated, or reduced such that only one "anchor" connection may be required system-wide. Otherwise, each hub 142 may be specified to allocate one of its connections to the "anchor" connection, reducing each hub's capacity to seven connections, thus using six hubs to support 40 connections, and yet another device to maintain the anchor connections (such as the SCM[s] 120, sensors 40, and/or other modules). To support simultaneously on-boarding of up to 40 phones, it is unlikely that a single SCM 120 is adequate; therefore, the SCHEM 110 may use three SCMs 120 if considered necessary, across which "anchor" connections may be distributed.

In one embodiment, if localization is based at least in part on UWB communications, the BLE connection may still be maintained to support command and control and data, where the UWB ranging events amongst all of the connected devices may be coordinated and managed in a similar way.

For instance, the BLE connections may be managed so that they do not conflict (across all BLE radios). Likewise, the UWB ranging events may be managed so that they do not conflict (across all UWB radios). It may be useful in some configurations to have multiple chips, even with UWB on a single radio frequency, to support a large number of devices due to memory/performance constraints and/or radio switching/correlation timing.

In one embodiment, the system 100 may be configured to obtain localization information, such as range information, based on UWB communications, there may be multiple UWB transceivers (e.g., multiple UWB controllers) that communicate using the same UWB channel on which localization (e.g., ranging) is being conducted. The UWB transceivers may coordinate use of the same UWB channel to conduct ranging in a coordinated manner (e.g., simultaneous usage of the UWB channel or coordinated sharing of the UWB channel). One or more of the UWB transceivers may be incorporated into the object device 50 of the system 100, such as the hub 142, the SCM 120, or another component of the system 100, or any combination thereof. For instance, two or more components of the system 100 may respectively include one or more of the UWB transceivers. In an alternative embodiment, different UWB channels may be utilized for UWB-based localization respectively by multiple UWB transceivers.

In one embodiment, the UWB transceivers may be incorporated into a sensor 40 in place of or in addition to a BLE module 42. The sensor 40 may communicate via an UWB channel with the portable device 20 in response to a directive from a controller, such as the hub 142 or the SCM 120, and obtain a sensed characteristic indicative of a range of the portable device 20 from the portable device 20 and/or based on the communications with the portable device 20. For instance, the portable device 20 may determine a range of the sensor 40 relative to the sensor 40 based on the UWB communications with the sensor 40, and communicate this information, as a sensed characteristic, to the sensor 40. This way, the sensor 40 may obtain a sensed characteristic of the communications. It is noted that the sensor 40 may obtain a sensed characteristic by measuring the sensed characteristic with respect to communications and/or receiving the sensed characteristic from another device, which may have measured the sensed characteristic with respect to communications.

It is to be understood that, in one embodiment, a sensor 40 may facilitate localization aspects, including ranging or obtaining a signal characteristic of communications pertaining to a location of a portable device 20. However, the present disclosure is not so limited. Any other component of the system 100 may facilitate such localization aspects, including the portable device 20, the hub 142, and the SCM 120.

In one embodiment, each of the individual hubs 142 may localize their connected devices and report location information back to a supervisor 140 processor.

In another embodiment, each of the individual hubs 142 may report signal characteristics for each device to the supervisor 140, so that the supervisor 140 may localize each device. As discussed herein, signal characteristics may include but are not limited to ToF, time stamps, computed distance from ToF, and clock corrections.

In yet another embodiment, hubs 142 may communicate with sensors 40 via a wired or a broadcast-style wireless auxiliary communications interface This may allow the supervisor 140 to receive directly from each sensor 40 the signal characteristics for each device connected to each hub 142 (i.e., the hubs 142 may not need to report signal characteristics to the supervisor 140 directly), so that the supervisor 140 may localize each device.

In yet another embodiment, each hub 142 may both localize connected devices and report location information, as well as report signal characteristics for each device, or the supervisor 140 may directly receive said signal characteristics via a wired or wireless bus, or any combination thereof, to the supervisor 140 processor so that the supervisor 140 may localize each device.

The hubs 142 may communicate location information to devices. This location information may originate from the hub 142 itself (in the case where the hub 142 localizes devices) or the hub 142 may obtain said location information from the supervisor 140 processor prior to providing it to the device (in the case where the supervisor 140 localizes devices). The supervisor 140 may also utilize information from other (potentially external) systems to localize and/or authenticate and/or authorize devices and/or users, such as camera systems, biometric systems, scanner systems and more.

The supervisor 140 may act as the coordinator amongst the SCMs 120, hubs 142 and other systems (e.g., vehicle subsystems, an embedded secure element, etc.). In an alternative embodiment, there may be multiple supervisor processors. In yet another alternative embodiment, a supervisor processor itself may be absent, but the supervisor role may be split and/or combined with SCM 120 and/or hub 142 processors.

For example, the supervisor 140 may, amongst the set of SCMs 120, do one or more of the following: coordinate which SCM 120 advertises at what time; coordinate how many connections each SCM 120 may allow; inform an SCM 120 of a set of connected devices to a set of hubs 142; verify authenticity of individual SCMs 120; perform security operations on behalf of an SCM 120; update the firmware of a particular SCM 120; ensure consistency checking and health monitoring amongst the set of SCMs 120; transfer connection information and/or parameters between SCMs 120 and/or hubs 142 and/or other systems; share authentication/authorization data from other systems; and so on.

For example, the supervisor 140 may, amongst the set of hubs 142, do one or more of the following: coordinate which hub handles a connection obtained from an SCM 120 (what to scan for, when, other connection parameters, etc., such as in a role-switching design); inform each hub 142 of which devices it may connect (e.g., in a non-role-switching design); verify authenticity of individual hubs 142; perform security operations on behalf of a hub 142; update the firmware of a particular hub 142; ensure consistency checking and health monitoring amongst the set of hubs 142; coordinate radio/communications schedules/timings amongst hubs 142; share authentication/authorization data from other systems; and so on. Coordination may be performed in such a way so as to evenly distribute processing load (e.g., round-robin or hash-based allocations of connections to SCMs 120 and hubs 142, etc.) or in such a way as to minimize power consumption (e.g., load SCMs 120 and/or hubs 142 one-at-a-time, so that unused processors may be powered off, etc.).

For example, the supervisor 140 may have one or more connections to vehicle and/or other systems. The supervisor 140 may send location or other information to other systems, and/or send/receive commands/requests to/from other systems via these connections. For example, the supervisor 140 may obtain vehicle state information via CAN bus and send said state information to a set of SCMs 120 and/or hubs 142. For example, the supervisor 140 may send/receive data to/from the Internet via a vehicle telematics control module connected via SPI. For example, the supervisor 140 may obtain occupant detection and/or other authentication and/or authorization information (e.g., raw camera information, raw biometrics information, or processed localization information based upon said cameras and/or biometrics, etc.) information from other systems via Ethernet or Wi-Fi. Alternatively or additionally, the SCMs 120 and/or hubs 142 may be connected to the same and/or different networks and/or subsystems, allowing said supervisor 140 operations to be distributed amongst the set of SCMs 120 and/or hubs 142 to reduce the supervisor's processing load and/or enhance its capabilities.

SCMs 120, hubs 142, and/or other systems may communicate with sensors 40, hubs 142, SCMs 120, supervisors 140 or other systems using any interconnect and/or set of interconnects (e.g., SPI, GPIOs, I2C, CAN, Ethernet, RS-485/422/232, UART, USB, LIN, K-Line, etc., or any combination thereof). In one embodiment, for example, SCMs 120 and hubs 142 communicate with a supervisor 140 via SPI, using GPIOs to select individual slaves and/or indicate a need to communicate.

The illustrated embodiment of FIG. 1 depicts an example of a BLE-based SCHEM embodiment supporting 40 devices with three SCMs 120, five hubs 142, and a supervisor processor. As described above, the SCHEM 110 may be connected to one or more other systems (e.g., vehicle CAN busses, telematics control unit, UWB modules, NFC readers, etc.) via any of the methods described above. In the depicted embodiment, the SCHEM 110 is connected to several vehicle CAN busses (150 and 152) and to a telematics control unit (TCU) 160 using CAN and SPI, respectively, via the supervisor processor 140. As described above, the SCHEM 110 may communicate with sensors 40 wirelessly or via a wired auxiliary communications interface (e.g., BackChannel or BC). In the depicted embodiment, the SCHEM 110 is connected to some number (N) of sensors via RS-485 (wired), with all hubs 142 and the supervisor 140 connected to the bus. In another embodiment, the SCHEM 110 may communicate with some number (N) of sensors 40 using the BLE radios (wireless) of the hubs 142. In yet another embodiment, the SCHEM 110 may communicate with sensors 40 using CAN. In yet another embodiment, the SCHEM 110 may communicate with sensors 40 using LIN. The SCHEM 110 may be configured such that each radio (one for each SCM 120 and one for each hub 142) is connected to the same antenna, each radio is connected to a different antenna, sets of radios are connected to sets of antennas, or any combination thereof. It is noted that an antenna may actually be an antenna array 30, such as for use when determining Angle of Arrival (AoA) and/or Angle of Departure (AoD) signal characteristics. SCMs 110 and/or hubs 142 may additionally or alternatively manage non-BLE radios, such as UWB radios.

In one embodiment, the SCHEM 110 may be combined and/or encapsulated by the TCU 160 (or vice versa).

It is noted that the depicted embodiment is merely representative and design trades may be made such that more or less SCMs 120 and/or hubs 142 are present. The illustrated embodiment of FIG. 2 depicts a system able to handle the same number of devices and sensors 40, but with fewer SCMs 120 (one), fewer hubs 142 (one), and no separate supervisor 140 processor (with potentially lower performance).

Figure 2:
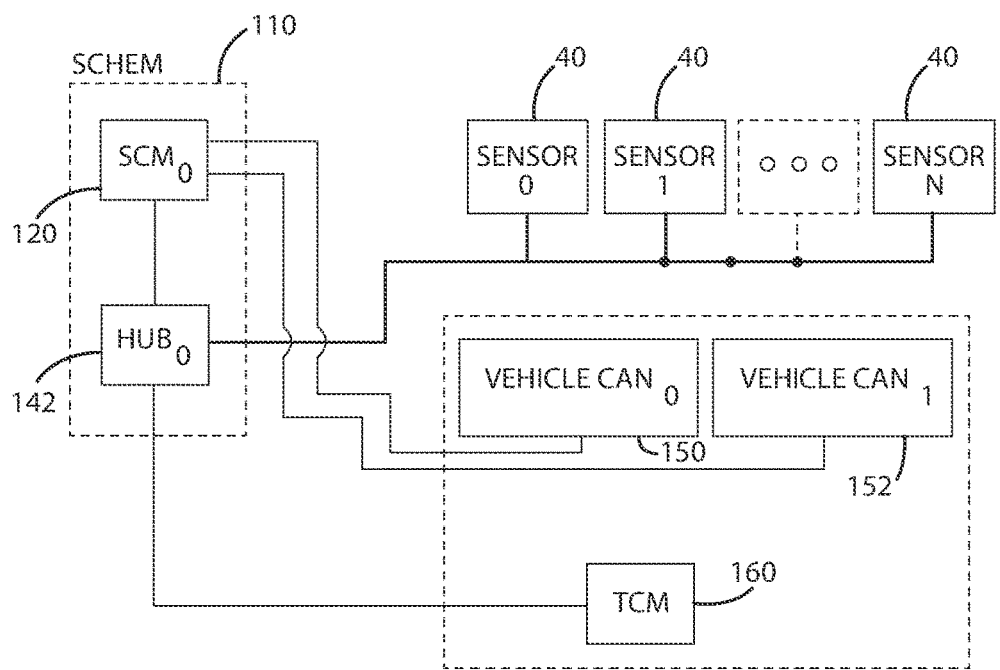
FIG. 2 shows a system in accordance with one embodiment.
Figure 3:
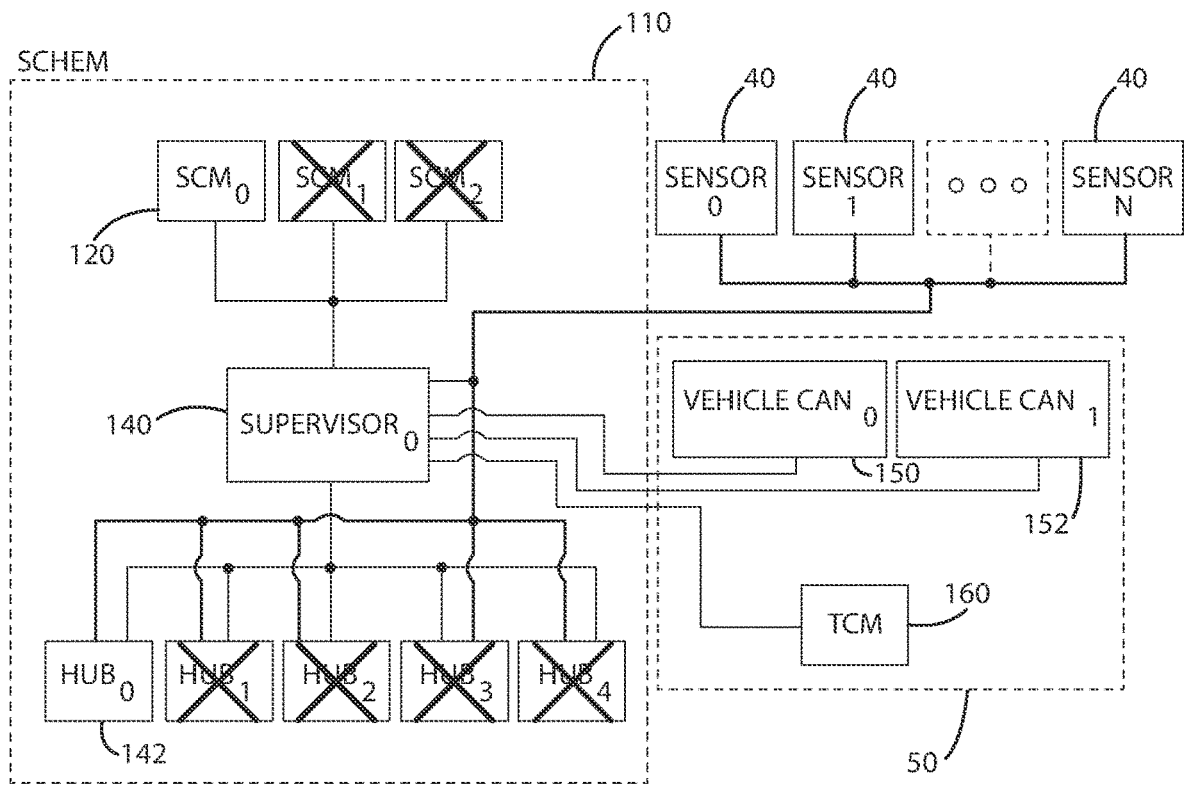
FIG. 3 shows an alternative embodiment of the system in FIG. 2.

As described earlier, it may be likely that existing processors used for the SCM 120 and/or hub 142 do not support, or do not have sufficient memory to localize large numbers of devices, and thus, the embodiment depicted in FIG. 2 may be costly in that it may be considered necessary to require the custom design of SCM 120 and/or hub hardware and/or software to support large numbers of devices. The use of a separate supervisor 140 processor may allow the system design to utilize existing SCM 120 and hub processor designs, while also improving system performance resulting in yet another SCHEM 110 embodiment similar to FIG. 1, wherein there exists one SCM 120, one hub 142, and one supervisor 140 as shown in the illustrated embodiment of FIG. 3.

B. Sensors

As described previously, SCHEMs 110 that support a large number of devices require sensors 40 that are able to determine signal characteristics for each of the said devices.

In a BLE-based sniffing microlocation system, sensors 40 may use BLE modules 42, but they may not operate in conventional central or peripheral roles. Unlike in one embodiment of a BLE-based microlocation system architecture, where sensors 40 may operate as advertisers (or beacons) in the peripheral role (i.e., the device connects to or observes the sensor 40) or wherein sensors 40 connect to or observe the device (wherein the device operates as an advertiser [or beacon] in the peripheral role), sensors 40 in BLE-based sniffing microlocation systems monitor the BLE connection between the device and the hub 142 to which it is connected, and thus may only determine signal characteristics on a particular frequency at a particular point in time for a particular device. As such, said BLE-based sensors may use any BLE module 42 that provides the radio control considered necessary within the required timing tolerances, necessary inputs/outputs to communicate with other hardware components, and processing capabilities and memory capacity to store determined signal characteristics for each tracked device (regardless of the stated maximum number of connections supported by that module's BLE stack, because the sensors 40 may not actually require the use of a BLE stack—they may just use the radio hardware on the same frequencies as BLE). For example, such a sensor 40 may use a proprietary software stack to determine signal characteristics and a proprietary BC communications protocol using the BLE radio of a particular BLE module 42, without actually using any of the BLE protocols or associated software stack(s). This may allow the system to utilize smaller, more cost-effective BLE modules 42 in sensors 40 than potentially other systems or other modules within the same system (e.g., SCMs 120 and/or hubs 142).

It is noted that, in one embodiment, automotive qualified parts may be used. BLE Time-of-Flight (ToF) and BLE AoA support may also be provided.

A sensor 40 may additionally or alternatively use UWB for communications and/or as basis for facilitating localization.

A system 100 may be provided where device communications may be parallelized across multiple hubs 142 to improve system performance. In such a system, as described herein, the sensors 40 may resolve the issues resulting from the parallelization.

In one embodiment, to help resolve described BC (auxiliary communications interface) parallelization issues for sensors 40, as well as improve system performance, the system 100 utilizes independent communications mediums for the primary and auxiliary communications interfaces—BLE for the primary communications interface and RS-485 (wired) for the auxiliary communications interface. In an alternate embodiment, the system 100 may utilize primary and auxiliary communications interfaces that are not independent (e.g., both operate wirelessly using BLE frequencies and/or UWB and/or another wireless communication techniques). Additional examples of the primary communications interfaces include UWB or Wifi, or a combination thereof. Additional examples of auxiliary communications interfaces include CAN or LIN based networks.

In one embodiment, to help resolve the primary communications interface parallelization issues for the sensors 40, as well as improve system performance, the sensors 40 may have a BLE module 42 for each hub 142 for the primary communications interface (e.g., if the SCHEM 110 has five hubs 142, each sensor 40 has five primary communications interface BLE modules 42). In an alternate embodiment, the sensors 40 may have fewer BLE modules 42 than the number of hubs 142 for the primary communications interface (e.g., if the SCHEM has five hubs 142, each sensor 40 may have three primary communications interface BLE modules 42). In yet another alternate embodiment, sensors 40 have more BLE modules 42 than the number of hubs 142 for the primary communications interface (e.g., a common sensor 40 designed for some maximum number of hubs 142, but used in a system with fewer hubs 142). The system 100 may coordinate communications schedules such that the number of devices communicating at the same time does not exceed the number of BLE modules 42 on sensors 40. Alternatively, or additionally, sensors 40 may only monitor up to the number of BLE module devices communicating at the same time, using any appropriate selection algorithm (e.g., round robin, random, priority, recency etc.) to select which devices amongst said set of devices to monitor, ignoring other non-selected devices during the presence of said communications conflicts. In one embodiment, while communicating with the portable device 20 in the central role for BLE-based communications, with multiple sensors 40, if there is overlap with communications, one subset of sensors 40, SCMs 120, and/or hubs 142, may select one portable device 20, while other subsets of sensors 40, SCMs 120, and/or hubs 142, may select or ignore other portable devices 20.

In one embodiment, with BLE, in the case where the portable device 20 is the central, the device in the peripheral role (e.g., the SCM 120 or hub 142) may request the portable device 120 to change its schedule to a schedule that does not conflict with the schedules of other connected portable devices (e.g., other centrals).

Figure 4:
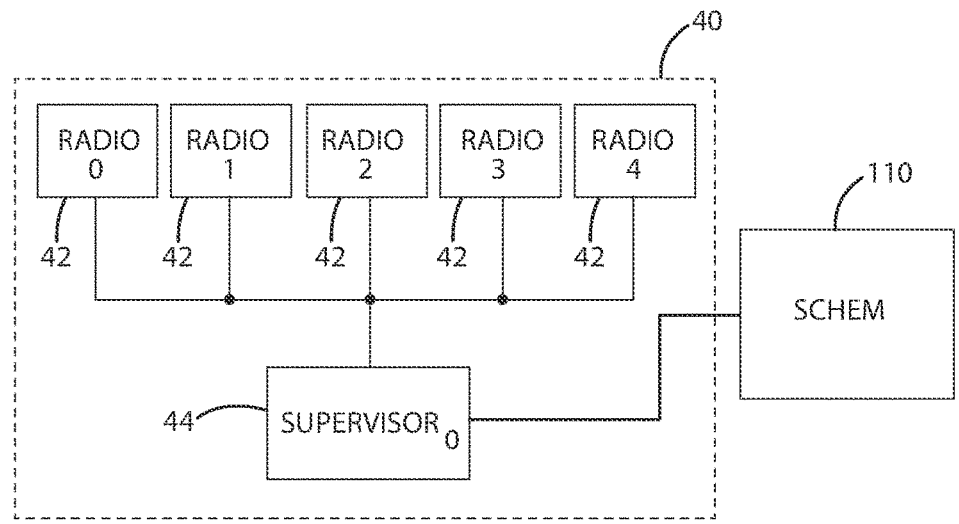
FIG. 4 shows a system in accordance with one embodiment of the present disclosure.

In one embodiment, each of the sensor's 40 BLE modules 42 may report determined signal characteristics for devices back to a supervisor 44, such as in the illustrated embodiment of FIG. 4 discussed in further detail herein. In another embodiment, each of the sensor's 40 BLE modules 42 may report raw radio signals and/or radio state for devices to the supervisor 44, wherein the supervisor 44 determines signal characteristics for devices. In yet another embodiment, each of the sensor's 40 BLE modules 42 may both report determined signal characteristics, as well as report raw radio signals and/or radio state for devices, to the supervisor 44. In yet another embodiment, each of the sensor's 40 BLE modules 42 may communicate with hubs 142 via a wired or a broadcast-style wireless auxiliary communications interface, allowing hubs 142 to receive directly from each sensor 40 the signal characteristics and/or raw radio signals and/or radio state for devices. In yet another embodiment, one of the sensor's 40 BLE modules 42 may communicate with hubs 142 via a wired or a broadcast-style wireless auxiliary communications interface, allowing hubs 142 to receive directly from each sensor 40 the signal characteristics and/or raw radio signals and/or radio state for devices. As discussed herein, the BLE modules 42 may alternatively or additionally include UWB capabilities, and wireless communications over UWB may form the basis for determined signal characteristics, raw radio signals, or radio state, or any combination thereof. The UWB wireless communications may be conducted in a manner similar to the BLE communications—e.g., each of the UWB modules of the sensor 40 may report determined signal characteristics for devices back to a supervisor 44.

It is noted that, for purposes of disclosure, a sensor supervisor 44 is considered to be different from a SCHEM supervisor 140.

The sensor supervisor 44 may act as the coordinator amongst the BLE modules 42 and other systems (e.g., hubs 142, SCHEM supervisors 140, other vehicle subsystems, an embedded secure element, etc.). In an alternative embodiment, there may be multiple supervisor 44. In yet another alternative embodiment, the supervisor 44 itself may be absent, but its role may be split and/or combined with BLE modules 42.

For example, the supervisor 44 may, amongst the set of BLE modules 42, do one or more of the following: coordinate which BLE module 42 monitors which devices at what time; coordinate how many connections each BLE module 42 may monitor; verify authenticity of individual BLE modules 42; perform security operations on behalf of a BLE module; update the firmware of a particular BLE module; ensure consistency checking and health monitoring amongst the set of BLE modules 42; coordinate radio/communications schedules/timings amongst BLE modules 42; transfer connection information and/or parameters between BLE modules 42 and/or hubs and/or other systems; share authentication/authorization data from other systems; and so on. Coordination may be performed in such a way so as to evenly distribute processing load (e.g., round-robin or hash-based allocations of connections to BLE modules 42, etc.) or in such a way as to substantially minimize power consumption (e.g., load BLE modules 42 one-at-a-time, so that unused processors may be powered off, etc.).

For example, the sensor supervisor 44 may have one or more connections to SCHEM 110, vehicle 10, and/or other systems. The sensor supervisor 44 may send determined signal characteristics to hubs 142 and/or SCHEM supervisors 140, and/or send/receive commands/requests to/from other systems, via these connections. For example, the sensor supervisor 44 may obtain vehicle state information via CAN and send said state information to a set of BLE modules 42. For example, the sensor supervisor 44 may obtain occupant detection and/or other authentication and/or authorization information from other systems and enable/disable sets of BLE modules 42. Alternatively or additionally, the BLE modules 42 may be connected to the same and/or different networks and/or subsystems, allowing said supervisor operations to be distributed amongst the set of BLE modules 42 to reduce the supervisor's processing load and/or enhance its capabilities.

BLE modules 42 and/or other systems may communicate with supervisors 44 and/or other BLE modules 42 using any interconnect and/or set of interconnects (e.g., SPI, GPIOs, I2C, CAN, Ethernet, RS-485/422/232, UART, USB, LIN, K-Line, etc., or any combination thereof). In one embodiment, for example, BLE modules 42 communicate with a supervisor 44 via SPI using GPIOs to select individual slaves and/or indicate a need to communicate. In another embodiment, for example, BLE modules 42 communicate with one another via SPI using GPIOs to select individual slaves and/or indicate a need to communicate.

The illustrated embodiment of FIG. 4 shows an example of a BLE-based sensor embodiment (e.g., sensor 40) supporting monitoring of up to five devices at the same time, with five BLE radios 42 and a sensor supervisor 44. As described above, sensors 40 may communicate with hubs 142 wirelessly or via a wired auxiliary communications interface (i.e., BC). In the depicted embodiment, the sensor 40 is connected to the SCHEM 110 of FIG. 1 (i.e., to five hubs 142 and/or one SCHEM supervisor 140 via RS-485 [wired]). In another embodiment, the sensor 40 may communicate with some number (N) of hubs 142 using its BLE radio(s) 42 (wireless). The sensor 40 may be designed such that each radio 42 is connected to the same antenna, each radio 42 is connected to a different antenna, sets of radios 42 are connected to sets of antennas, or any combination thereof. It is noted that an antenna may actually be an antenna array 30, such as for use when determining AoA and/or AoD signal characteristics.

It is also noted that the depicted embodiment is merely representative and design trades may be made such that more or less BLE modules 42 are present. Likewise, it is noted that the depicted embodiment uses BLE modules 42, but these may instead be UWB modules. UWB communications may be conducted in a manner similar to that described for the BLE modules 42 with the primary exception being a difference in hardware and communications protocol.

Figure 5:
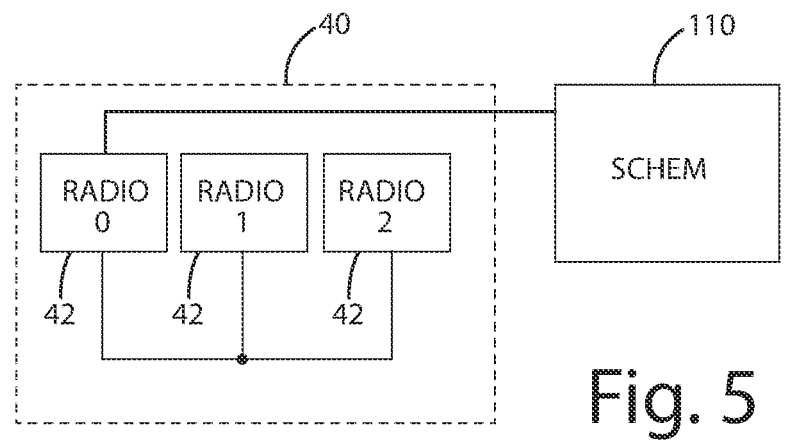
FIG. 5 shows another system in accordance with one embodiment of the present disclosure.

The illustrated embodiment of FIG. 5 shows an example of a BLE-based sensor embodiment (e.g., sensor 40) that supports monitoring of up to three devices at the same time, with three BLE radios 42 and no supervisor processor 44. In the depicted embodiment, the sensor 40 is connected to the SCHEM 110 of FIG. 1 (i.e., to five hubs 142 and/or one SCHEM supervisor 140 via RS-485 [wired]). As described earlier, wherein such a sensor 40 is used with such a SCHEM 110, the SCHEM's hubs 142 may coordinate communications whereby no more than three devices communicate at the same time. In this depicted embodiment, BLE modules 42 communicate amongst themselves (e.g., using SPI). In this depicted embodiment, one of the BLE modules 42 is responsible for performing the supervisor role (i.e., that BLE module 42 may perform BLE module coordination, communicate with hubs 142 via the auxiliary communications interface, etc.).

Figure 6:
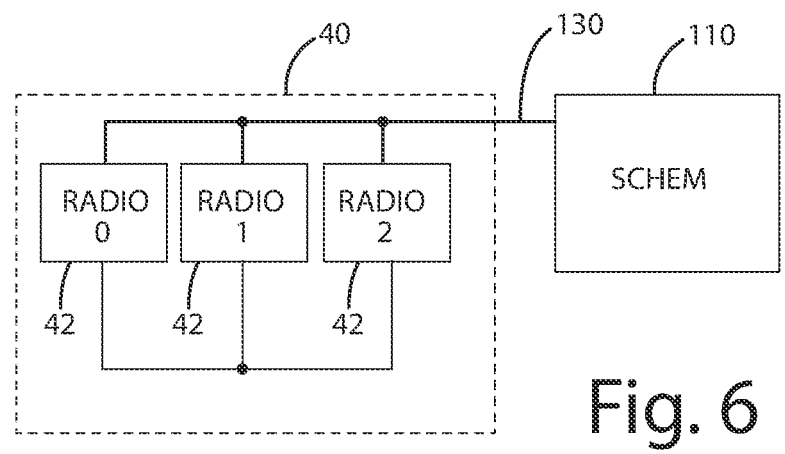
FIG. 6 shows yet another system in accordance with one embodiment of the present disclosure.

The illustrated embodiment of FIG. 6 is similar to FIG. 5, except that with this sensor 40, each BLE module 42 may communicate with hubs 142 via the auxiliary communications interface 130. In this depicted embodiment, each BLE module 42 may perform a subset of the supervisor role.

C. SCHEMs and Sensors with Mixed Technologies

Several embodiments described herein focus upon BLE-based systems, but the concepts are not limited to BLE. Many of the depicted embodiments describe SCHEMs 110 and/or sensors 40 comprising of multiple radios. SCHEMs 110 and/or sensors 40 may employ many communications mediums and/or technologies to localize, authenticate, and authorize devices (and/or their users).

In one BLE-based system embodiment, the SCHEM 110 and/or sensors 40 may, additionally or alternatively, use UWB (Ultra Wide Band) to localize, or additionally support the localization of, devices. For example, SCHEMs and/or sensors may have a set of UWB modules in addition to a set of BLE modules 42. This set of UWB modules may communicate with system components in the same way that BLE modules 42 do, wherein in this case, reported signal characteristics may include RSSI, time-of-flight (ToF), computed distance, security, and/or other UWB or localization attributes. In an alternate system embodiment, the SCHEM and/or sensors may use only UWB to localize devices. Alternatively, or additionally, UWB signal characteristics, measured by devices may be reported to hubs, via devices.

In one BLE-based system embodiment, the SCHEM and/or sensors 40 may, additionally or alternatively, use LF (Low Frequency—magnetic and/or electric—such as those used in current LF-based automotive PEPS systems) to localize, or additionally support the localization of, devices. For example, SCHEMs and/or sensors may have a set of LF coils and/or modules in addition to a set of BLE modules 42. This set of LF coils and/or modules may communicate with system components in the same way that BLE modules 42 do, wherein in this case, reported signal characteristics may include RSSI, computed distance, security, and/or other LF or localization attributes. In an alternate system embodiment, the SCHEM and/or sensors 40 may use only LF to localize devices. Alternatively, or additionally, LF signal characteristics, measured by devices, may be reported to hubs 142, via devices.

In one BLE-based system embodiment, the SCHEM and/or sensors 40 may, additionally or alternatively, use NFC (Near-Field Communications) to localize, or additionally support the localization of, devices. By requiring the user 60 to place a device within a few centimeters of a sensor 40, the device has been localized to that sensor 40. For example, SCHEMs and/or sensors 40 may have a set of NFC modules in addition to a set of BLE modules 42. This set of NFC modules may communicate with system components in the same way that BLE modules 42 do, wherein in this case, reported signal characteristics may include one or more of the following: authentication and/or authorization data; identity (user and/or device) information; security information; localization information (which sensor); application protocol data units (APDUs) and/or their inputs/outputs; application data; and/or other NFC or localization attributes. In an alternate system embodiment, the SCHEM and/or sensors 40 may use only NFC to localize devices. Alternatively, or additionally, NFC signal characteristics, measured by devices, may be reported to hubs 142, via devices.

Other potential technologies that may be incorporated in SCHEMs and/or sensors 40 include, but are not limited to the following: ultrasonic; biometrics (e.g., fingerprint readers, cameras, facial recognition systems, body mass and/or body heat systems, heart-rate/heart-rhythm/breathing-pattern/etc. systems, etc.); UHF; VHF; RFID; GPS; or any other technology and/or communications medium useful for localizing, or supporting the localization of, devices.

IV. Parallelization

In one embodiment, the control system 110 (e.g., SCHEM) is configured to parallelize connections with multiple portable devices 20 and sensor data by using multiple BLE chips in some conjunction with the roles of the SCM 120 and the hub 142. The activities of the BLE chips may be coordinated (e.g., frequencies and timings controlled so as to avoid collisions, which chip connects to which portable device 20, etc.) and their results collected and communicated back to an external system. In the illustrated embodiment, the control system 110 includes a supervisor 140 to facilitate coordination of communications in a parallelized manner. It is noted that the supervisor 140 is optional; one or more embodiments may not include the supervisor 140 to coordinate communications such that one or more electronic system components 70 of the system 100 may coordinate such communications without the supervisor 140. Although BLE chips are described in this embodiment, it is to be understood that additionally or alternatively, UWB or another wireless communications interface may be implemented on the BLE chip or chips.

Parallelization may raise issues with sensors 40 that communicate with multiple hubs 142 using the same communications medium as the portable devices 20 (e.g., via BLE frequencies within the constraints of the connection interval or via UWB frequencies within the constraints of a ranging event) using a single radio (unless the sensors 40 are replicated for each hub 142, which may not be feasible or practical).

In a system 100 with a single hub 142, a sensor 40 may communicate with the hub 142, receiving from the hub 142 connection information and sending to the hub 142 sensed characteristics for the portable device 20 connected to the hub 142. If there are multiple hubs 142, and the sensors 40 are shared amongst them, the sensors 40 may be configured to complete this for each hub 142 simultaneously (or seemingly simultaneously). The sensors 40 may combine connection information and/or ranging event/timing information obtained from each hub 142 and send sensed characteristics back to each hub 142 for each portable device 20. Even if the multitude of the hubs 142 are able to coordinate the communication schedules such that each portable device 20 does not communicate on the same frequency at the same time, a sensor 40 may be configured to send data on different frequencies at the same time (i.e., data for different hubs 142), which may not be possible such as in the case of a sensor 40 with a single radio. Alternatively, in the presence of conflict, the system 100 may instruct some sensors 40 to communicate with some portable devices 20, and other sensors 40 with other portable devices 20, at different times. For purposes of disclosure, "at the same time" does not necessarily mean only send/receive at exactly the same time. "At the same time" may also include the time for the sensor 40 to power on/off and/or switch to the correct frequency to send/receive.

The system 100, including the sensors 40, may be configured for parallelization in a variety of ways, as discussed herein in one or more embodiments.

A. Backchannel Independence; Backchannel (Auxiliary Communications Interface) Coordination In one embodiment, instead of utilizing a backchannel (BC) communications interface or auxiliary communications interface 130 with hubs 142 using the same communications medium, radios, and/or frequencies as the primary communications interface 132 (e.g., the interface used by devices such as phones to communicate with the system), a different, independent communications medium (such as a wired medium or a wireless medium utilizing one or more separate radios) may be provided for the auxiliary communication interface 130. For example, a wired communications medium may be used for sensors 40 to send data to hubs 142 (the BC or auxiliary communications interface 130), allowing sensors 40 to send data to hubs 142 when the medium is available without constraints imposed by portable devices 20 operating on the primary communications interface 132, potentially queuing data if it is not available when it desired to send data (e.g., when measurements are obtained, when a measurement cycle is completed such as the connection interval, time interval, etc.), while still allowing the sensor 40 to continue measuring signal characteristics via the primary communications interface 132. The BC or auxiliary communication interface 130 may be a wired communications bus (where all or a subset of sensors 40 and hubs 142 share the same medium, e.g., CAN, LIN, K-Line, USB, RS-485/422/232, Ethernet, I2C, SPI, etc.), or there may be independent channels for each or sets of sensors 40 (e.g., star or other network topologies). In one embodiment, such as in the case of the illustrated embodiment of FIG. 7, a subset of the sensors 40 that are disposed on the object 10 (e.g., the vehicle) may be coupled via a wired interface to the control system 110, and another subset of the sensors 40 disposed on a physical structure separate from the object 10 may be communicatively coupled to the control system 110 via a wireless medium. For instance, in the case of a vehicle, as the vehicle approaches a boarding location or stop, the sensors 40 physically located at that stop instead of on the vehicle may communicate via an auxiliary communication interface with the control system 110 of the vehicle. Alternatively, or additionally, one or more hubs 142 and one or more SCMs 120 may be disposed near the stop but separate from the vehicle, and may communicate with aspects of the vehicle (e.g., a portion of the control system 110) to facilitate locating one or more portable devices 20 in proximity to the stop.

The communications and coordination strategy and timing on the BC 130 may vary based upon the medium itself, the protocols chosen, system timing requirements, or other system requirements. For example, with a wireless BC, each hub 142 may send/receive on a different frequency, or all or a subset of the hubs 142 may send/receive on the same frequency, or any combination thereof. As a result, the communications and coordination strategy may involve ensuring that each sensor 40 can send data on the right frequencies at the right times to avoid interference (i.e., that the hubs 142 are coordinated such that the hubs 142 avoid requesting sensors 40 to communicate in a way that is not feasible given the system and hardware architecture). Similar to utilizing multiple radios for the primary communications interface 132, the sensors 40 may use multiple radios to simultaneously communicate on multiple frequencies of a wireless BC 130 (auxiliary communications interface). The ability of a sensor 40 to send data at the right time to avoid interference includes appropriate selection and analysis of BC bandwidth (and corresponding throughput considerations).

A BC 130 may be provided with high enough bandwidth, such that all sensors 40 may be able to send all of their data (e.g., signal characteristics for each portable device 20 such as a phone that each hub 142 has instructed the sensor 40 to monitor) to all hubs 142 without needing to queue sends (i.e., all data is sent before new data needs to be sent, except in exceptional/error conditions). For example, in a system 100 where portable devices 20 are monitored via BLE, and sensors 40 communicate with hubs 142 via a BC 130 of another medium, the BC 130 may be provided with sufficient bandwidth such that all determined signal characteristics for all portable devices 20 from connection interval X may be sent to all hubs 142 from all sensors 40 before the next set of determined signal characteristics is sent for connection interval X+M (where ideally M=1). Determined signal characteristics for connection interval X may be sent before the end of, or at any other designed point in time, absolute or relative to, connection interval X+N (where ideally N=0 [same connection interval], N=1 [before the same point in the next connection interval], etc.). In other words, enough bandwidth may be provided for the system to be able to send all of the data it is measuring to the hub 142 without falling behind. Lower bandwidth BCs may also be utilized. Communication schemes may be used such that data is intentionally queued at various times by various sensors 40, allowing a sensor 40 to send more data in bulk, skip data sets, aggregate data, or other network communications strategies.

B. Primary Communications Interface Coordination

Usage of such a BC 130 allows sensors to communicate with multiple hubs more easily by substantially reducing or eliminating interference between primary and auxiliary communications interfaces (e.g., via radio independence from the primary communications medium, coordination, etc.) and between hubs 142 on the auxiliary communications interface (via the communications and coordination strategies); however, it does not substantially reduce or eliminate the potential need for the portable device 20 (e.g., phone) communications to be coordinated amongst hubs in some way.

When multiple portable devices 20 are communicating on the primary communications interface 132 at the same frequency, the system 100 may be configured such that the portable devices 20 communicate at different times to avoid interfering with one another; the portable devices 20 may not be aware of the existence of multiple hubs 142; a portable device 20 may communicate with a hub 142 using a communications schedule and parameters determined by the hub 142; therefore, the set of hubs 142 may coordinate primary communications interface communications schedules and parameters amongst themselves such that all devices connected to the system 100 (across all hubs 142) communicate without interfering with one another.

A system in accordance with one embodiment may utilize a frequency-hopping scheme, both to avoid collisions and to operate better in noisy RF environments (such as BLE) and thus, in such systems, in addition to communicating at different times, each portable device 20 may be communicating at a different frequency at those points in time. With a large enough set of possible frequencies, it may seem that the probability of one device interfering with another is sufficiently small, such that coordination may not be considered necessary; however, when the time required for a sensor 40 to power on/off and/or switch frequencies to monitor a particular portable device 20 is considered, combined with an increasingly large number of devices communicating frequently (e.g., a short connection interval), it may not be possible for a sensor to monitor all requested devices without coordination. In other words, in highly responsive systems with many portable devices 20, it is likely that the portable devices 20 will interfere with one another.

C. Sensors with Multiple Radios and Timing Coordination

1. Multiple Radios

Alternatively, or additionally, sensors 40 may use multiple radios for the primary communications interface 132 and/or auxiliary communications interface 130 to support communication on multiple frequencies at the same time (see prior definition of this term). The sensors 40 may be configured such that the number of radios for any particular interface may be less than, equal to, or greater than the maximum number of portable devices 20 that may be communicating at the same time, depending upon desired system performance.

For example, the sensors 40 may use one radio for each hub 142 for the primary communications interface 132 and/or the auxiliary communications interface 130. In other words, if the system consists of four hubs 142, each sensor 40 may possess four primary communications interface 132 radios (one for each hub 142). In this way, less coordination may be required amongst sensors 40/hubs 142/portable devices 20, and thus may require less software development effort implemented.

Alternatively, or additionally, a sensor 40 may only use (e.g., power, schedule communications for, etc.) the number of radios of the multitude necessary to monitor each portable device 20 communicating at the same time. Alternatively or additionally, the sensor 40 may use the same approach with a multitude of auxiliary communications interface (BC) radios (wireless interface) and/or wired interfaces. In this way, sensors 40 may limit power consumption by only utilizing additional radios when necessary. Additionally, in this way, sensors 40 may have fewer radios than the number of hubs 142. Even in a system with four hubs 142, with eight devices connected to each hub 142, depending upon the system configuration (e.g., connection interval duration and timing offsets, hub coordination, etc.), it may be sufficiently unlikely that sensors 40 are required to monitor more than two or three portable devices 20 (i.e., communicate on more than two or three frequencies) at the same time, and thus the sensors 40 with only two or three radios may be utilized.

Alternatively, or additionally, a sensor 40 may only have a certain number of radios (e.g., fewer than the number of the hubs 142) due to cost, space, connectivity, or other design constraints. In this case, as described later, communications coordination may be specified to ensure that the maximum number of portable devices 20 communicating at the same time is not exceeded.

Alternately, the sensors 40 may have more radios than the number of hubs 142. This may be the case when a sensor 40 designed for a system 100 with a large number of hubs 142 is used in a system 100 with a fewer number of hubs 142. In any of the above configurations, radios may be powered off when not required, to conserve power.

2. Timing Coordination

The sensors 40 may be able to monitor more portable devices 20 across more hubs 142 with fewer radios, if the hubs 142 carefully coordinate the portable device 20 and the hub 142 timing requirements. If the system 100 can guarantee that a sensor 40 will never need to monitor more than one portable device 20 on different frequencies at the same time, then the sensor 40 may only require one primary communications interface radio, regardless of the number of portable devices 20 and/or hubs 142. Likewise, if the system 100 is configured such that a sensor 40 will never need to send data on the auxiliary communications interface 130 on more than one frequency at the same time, then the sensor 40 may use only one auxiliary communications interface radio, regardless of the number of portable devices 20 and/or hubs 142. In addition to, or alternatively, such coordination across multiple frequencies, the transmit/receive timing may be coordinated on primary communications interfaces 132 and/or auxiliary communications interfaces 130 to recover from, mitigate, and/or avoid multiple portable devices 20 and/or hubs 142 from sending/receiving data on the same frequency at substantially the same time (e.g., collisions that may occur in either single-frequency and/or multi-frequency systems, misbehaving transmitters/actors, etc.). Retrying/repeating a failed send/receive is an example of recovering from such an event, combining data to be sent/received is an example of mitigating such an event, and scheduling sends/ receives in a way that such collisions do not occur is an example of avoiding such an event. If the system 100 is able to coordinate communications on a particular interface in such a way that both sending/receiving on different frequencies at the same time and sending/receiving on the same frequency at the same time are avoided, then that interface may use only a single radio or wired interface. Furthermore, if multiple communications interfaces exist that use the same frequencies, and if the communications interfaces are coordinated in the same ways as described above, then a single radio may be used to operate both communications interfaces.

For example, in a BLE-based system comprising multiple hubs 142, if all hubs 142 coordinate communications on the primary communications interface 132 in such a way that each portable device 20 never communicates with a hub 142 at the same time as any other portable device 20, then each sensor 40 may use a single BLE radio for the primary communications interface 132.

For example, in a BLE-based system consisting of multiple hubs 142, if all hubs 142 coordinate communications on the auxiliary communications interface 130 in such a way that each sensor 40 never communicates with a hub 142 at the same time as any other sensor 40, then each sensor 40 may use a single BLE radio for the auxiliary communications interface 130. It should be noted that sensors 40 may send/receive one or more messages directed to specific hubs 142 (such as more small messages or a message containing signal characteristics for a particular hub 142 or for each hub 142), one or more messages broadcast to one or more (or all) hubs 142 (i.e., fewer large messages or a message containing signal characteristics for all hubs 142 broadcast to all), or any combination or permutation thereof.

For example, in a BLE-based system where both the primary and auxiliary communications interfaces use a BLE radio (i.e., the interfaces use BLE or a proprietary protocol operating on the same BLE frequencies/channels with the same hardware/radio), if all hubs 142 coordinate primary communications interface 132 and auxiliary communications interface 130 communications such that portable devices 20 and sensors 40 never send/receive at the same time, then a single BLE radio may be used for both the primary and auxiliary communications interfaces. This may yield a system where there is one BLE radio that operates both primary and auxiliary communications interfaces.

One aspect in implementing such coordination with the desire to limit the number of radios is that, as the number of sensors 40, hubs 142, and portable devices 20 increases, timing challenges may become more pressing, and thus the system may trend towards having a longer connection interval to accommodate the necessary coordination (e.g., less responsiveness).

i. Single Radio Used for Both Primary and Auxiliary Communications Interfaces Example In one system, with a BLE SCHEM 110 with one hub 142 (supporting four devices) and 11 sensors 40, 4 ms may be allocated for each portable device 20 and about 292 us (4×2B+16B overhead with 100 us gap between sensors 40 reporting) for each sensor 40 to send data to the hub 142 (2.86 ms at 1 mbps).

If a BLE SCHEM 110 is provided that supported 40 portable devices 20 (five hubs 142, eight phones [portable devices 20] per hub 142) and 24 sensors 40, and 4 ms is allocated for each portable device 20 and 356 us (8×2B+16B overhead with 100 us gap between sensors 40 reporting) for each sensor 40 to send data for each hub 142 (8.55 ms at 1 mbps), a connection interval is provided as depicted in the illustrated embodiment of FIG. 10.

Also present, but not shown, may be additional synchronization, timing measurement sequences (Time of Flight), other control messages, or any combination thereof, that may be encapsulated in the CE, S, and/or BC communications windows. One or more aspects of the system may be implemented in conjunction with one or more aspects of the microlocation system(s) described in U.S. Nonprovisional application Ser. No. 15/852,396, entitled SYSTEM AND METHOD FOR MICROLOCATION SENSOR COMMUNICATION, filed Dec. 22, 2017, to Stitt et al.—the disclosure of which is hereby incorporated by reference in its entirety.

In this example, the scanning time is used to fill the gap of the connection intervals, but other arrangements are possible, such as sending BC data before the scanning time, depicted in the illustrated embodiment of FIG. 11.

This arrangement provides data to the hub 142 earlier in the connection interval, but may affect the receiving hubs' 142 ability to determine exactly when to listen for the BC data from the sensor 40 (with wireless interfaces), because the duration of the connection events window may be dependent upon the number of connected portable devices 20. In some embodiments, the duration of the connection events window may be fixed at the maximum size. Although the duration of each window may vary in duration depending upon the implementation for the following depictions, each window's duration is fixed in size (at the maximum possible duration to show an example of a fully-loaded system).

The examples shown in the illustrated embodiments of FIGS. 12-14 are depicted with the first connection interval arrangement (CE→S→BC). It may be useful for the connection events window to have an anchor connection—an OPTIONAL connection that may be present to simplify system software implementations (but for which signal characteristics are not reported) and aid timing synchronization; therefore, in the timing estimates below, an additional connection is counted (9 instead of 8).

As shown in the diagram above for this example, the connection interval duration to encapsulate all (five) cascaded hub 142 communications is: (idle time)+(CE duration)+(S duration)+(BC duration).

The CE (Connection Event) duration is a function of at least the amount of data desired to communicate during CEs to/from devices 20, the number of devices 20 communicating, and the communication medium bandwidth (e.g., one, two, four or more packets, at what length[s], and at what speed [e.g., 1 mbps, 2 mbps, etc.]). For this example, there are nine CEs at 4 ms each.

The S (Scanning) duration is a function of at least the advertising intervals offered and/or found to be ideal for the set of devices 20 connecting to the system and, if considered necessary, the minimum duration considered necessary to delay BC communications until after the CE window. In this example, this duration is set to the duration of the cascaded CE window minus one sensor 40 (or some determined minimum): MAX(CE duration*[number of hubs−1], 36 ms).

The idle time duration is the time considered necessary to offset communications such that there is no overlap, which may occur at the end or beginning of the connection interval for a particular set of devices 20/hubs 142. In this example, the duration is set to the duration of the cascaded CE window minus one sensor: CE duration*(number of hubs−1).

The BC duration is a function of at least the amount of data required for each sensor 40 for each device 20, the number of sensors 40, and the communications medium bandwidth (e.g., 1 mbps, 2 mbps, 8 mbps, etc.). In this example, the duration is set using 24 sensors 40 at 364 us each.

The time considered necessary for each hub 142 may be: [–CE: 9 devices×4 ms=36 ms–][–S=144 ms–][–BC: 24×364 us=~8 ms–]=188 ms.

Therefore, the total duration of the connection interval for this example may be 332 ms: 36 ms*(5−1)+36 ms+36 ms*(5−1)+8 ms→144 ms+36 ms+144 ms+8 ms There may also be embodiments where, during idle time, the hub 142 may scan. This may be used to reduce the connection interval duration substantially (e.g., with this example, from 332 ms to 220 ms) as depicted in the illustrated embodiment of FIG. 13.

In such an approach, it may make sense to use the (CE→BC→S) approach, to allow the radio to scan longer (less mode switching), such as depicted in the illustrated embodiment of FIG. 14.

It may be considered necessary to add some buffer time with the above approach (between CE→BC), due to variations in device 20 scheduling and communications, as well as to allow sensors 40 to perform any necessary computations prior to beginning BC communications.

In an alternate system, where each hub 142 can manage 16 connections (devices 20), at 2 ms per connection in the CE window (32 ms per hub 142), with an 8 mbps BC (1 ms BC duration per hub 142), 45 devices (assuming one anchor connection per hub 142) may be supported with three hubs 142 in a 97 ms connection interval ((32 ms CE)*(3−1) [64 ms] S+32 ms CE+1 ms BC). The communication methodology in one embodiment is depicted in FIG. 15.

One advantage of this approach is that it substantially minimizes use of the radio frequency spectrum of the communications interface. For example, with BLE, it reduces the system's use of the BLE spectrum to only one channel (frequency) at a time (plus advertising devices).

ii. Multiple Radios Used for Both Primary and Auxiliary Communications Interfaces Example In an alternative embodiment of such a system above, wherein multiple BLE radios are used such that sensors 40 and hubs 142 may transmit and receive up to three different frequencies at the same time on both primary communications interfaces 132 and auxiliary communications interfaces 130, 45 devices 20 may be supported with a 49 ms connection interval (32 ms+17 ms). An example of this communication methodology is shown in the illustrated embodiment of FIG. 16.

A system 100 wherein a sensor 40 has fewer radios than the number of hubs 142 (e.g., only two radios shared for the primary and auxiliary communications interface despite having three hubs) results in only a slightly longer connection interval (around 66 ms) with potentially lower power consumption and cost at the expense of more coordination, such as depicted in the illustrated embodiment of FIG. 17.

iii. Multiple Radios Used for the Primary Communications Interface and a Wired Auxiliary Communications Interface Example The system in one embodiment may include an auxiliary communications interface 130 that cannot (or does not) simultaneously send/receive on different frequencies (e.g., a wired interface or a wireless interface where the same frequency is used for all communications in the connection interval) such as depicted in the illustrated embodiment of FIG. 18.

Figure 19:
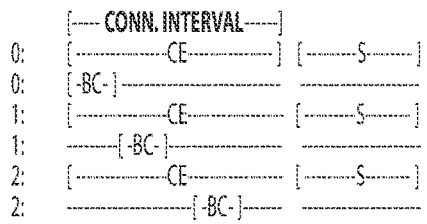
FIG. 19 is a timing diagram of communications in accordance with one embodiment.

It should be noted that with a wired auxiliary communications interface 130 (or wireless, if it is an independent medium), the BC data may additionally or alternatively be sent in parallel with the S and/or CE activity (e.g., the radio[s] may be scanning while data is simultaneously sent/received on the wired interface). Such an arrangement may allow the scanning window to be shortened or eliminated (if desired) and is depicted in the illustrated embodiment of FIG. 19.

iv. Do Nothing

In one embodiment, nothing may be done to mitigate communication interference. There are multiple levels of doing nothing. One option is where the system tries its best to recover from, mitigate and avoid collisions and/or the need to send/receive on multiple frequencies at the same time simply by not attempting to coordinate amongst hubs 142 and/or intentionally randomizing aspects of the communications protocols and/or device 20/sensor 40 communications timings. When it is detected that a conflict has occurred, then recovering, mitigating or avoiding communications during said conflict (e.g., dropping the data, sending it later, etc.) occurs. Another option is to do the same, but not attempt to detect when such a conflict may exist, and instead rely upon lower-level hardware and/or communications protocols to determine that data has been corrupted and ignore it.

V. Locator

The system 100 in the illustrated embodiment may be configured to determine location information in real-time with respect to the portable device 20. In the illustrated embodiment of FIGS. 7 and 8, the user 60 may carry the portable device 20 in proximity to the system 100. It is noted that multiple users 60 and multiple associated portable devices 20 may be transported into and out of proximity to the system 100. For purposes of discussion, determining location of a portable device 20 based on one or more signal characteristics of communications with the portable device 20 is described in conjunction with a single device—however, it should be understood that the locations of multiple portable devices 20 may be determined based on one or more signal characteristics of communications obtained in connection with the respective portable device 20.

In the illustrated embodiment of FIG. 8, the system 100 may facilitate locating the portable device 20 with respect to the object 10 (e.g., a vehicle) in real-time with sufficient precision to determine whether the user 60 is located at a position at which access to the object 10 or permission for an object 10 command should be granted.

For instance, in an embodiment where the object 10 is a vehicle, the system 100 may facilitate determining whether the portable device 20 is outside the vehicle but in close proximity, such as within 5 feet, 3 feet, or 2 feet or less, to a door or entry point. This determination may form the basis for identifying whether the system 100 should authorize an action and/or to perform an action. For instance, the system 100 may authorize access to the vehicle or object 10. As another example, the system 100 may record a location of the vehicle or object 10 at the time of entry of the user 60. There are several additional examples of actions and authorizations described herein, as well as U.S. Provisional Application No. 62/720,975, entitled SYSTEM AND METHOD OF DETERMINING REAL-TIME LOCATION, filed Aug. 22, 2018, to Smith—the disclosure of which is hereby incorporated by reference in its entirety.

The object 10 may include object devices or a variant thereof, such as a sensor 40 coupled to an antenna array 30 in accordance with one or more embodiments described herein.

Micro-location of the portable device 20 may be determined in a variety of ways, such as using information obtained from a global positioning system, one or more signal characteristics of communications from the portable device 20, and one or more sensors (e.g., a proximity sensor, a limit switch, or a visual sensor), or a combination thereof. An example of microlocation techniques for which the system 100 can be configured are disclosed in U.S. Non-provisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIGS. 7 and 8, an object device of the object system 50 (e.g., a system control module (SCM 120) or a hub 142) and a plurality of sensors 40 (coupled to one or more antenna arrays 30) may be disposed on or in a fixed position relative to the object 10. Example uses of the object 10 include the vehicle identified in the prior example, or a building for which access is controlled by the object device.

For instance, the portable device 20 may communicate wirelessly with a hub 142 via a communication link. The plurality of sensors 40 may be configured to sniff the communications between the portable device 20 and the hub 142 to determine one or more signal characteristics of the communications, such as signal strength, AoA, ToF, or any combination thereof. In an alternative embodiment, the portable device 20 may establish communications with another device other than the object device, and at least one of the object device and the one or more sensors 40 may be configured to sniff these communications to determine a location of the respective device relative to the object 10.

In one embodiment, the portable device 20 may communicate wirelessly with a SCM 120 or hub 142 via a primary communications link. The plurality of sensors 40 may be configured by the SCM 120 or the hub 142 or directly by the portable device 20 to perform a ranging operation with the portable device 20 at some time (immediately, periodically, etc.) to determine one or more signal characteristics of the communications on a ranging communications link, such as signal strength, AoA, ToF, clock skew, other timing characteristics, or any combination thereof. The primary communications link and the ranging communications link may be different radio technologies, such as BLE and UWB, respectively.

For purposes of disclosure, one or more embodiments described herein include ranging or locating a portable device 20 based on communications that occur over a primary communication link, which may be a BLE communication link. It is to be understood that ranging a portable device 20 based on communications may be conducted with respect to multiple or alternative communications links, such as ranging based on communications over both BLE and UWB communications links or ranging based on communications over UWB. In one embodiment, where ranging is conducted with respect to communications over UWB or a communication link other than a BLE communications link, a BLE communications link may also be established for communicating information, such as connection parameters, authentication and authorization parameters, or one or more signal characteristics.

The determined signal characteristics may be communicated or analyzed and then communicated to a component of the object system 50 via a communication link 130 separate from the communication link between the portable device 20 and the hub 142. Additionally, or alternatively, the portable device 20 may establish a direct communication link with one or more of the sensors 40, and the one or more signal characteristics may be determined based on this direct communication link. For instance, the portable device 20 may establish a UWB and/or BLE link with one or more of the sensors 40, and the one or more signal characteristics may be determined based on this communication link.

As described herein, one or more signal characteristics, such as signal strength, ToF, and AoA, may be analyzed to determine location information about the portable device 20 relative to the object 10, an aspect of the object 10, or the object device, or a combination thereof. For instance, time difference of arrival, AoA, or both, among the sensors 40 and the object device may be processed to determine a relative position of the portable device 20. The positions of the one or more antenna arrays 30 relative to the object device may be known so that the relative position of the portable device 20 can be translated to an absolute position with respect to the antenna arrays 30 and the object device.

Additional or alternative examples of signal characteristics may be obtained to facilitate determining position according to one or more algorithms, including a distance function, trilateration function, a triangulation function, a multilateration function, a fingerprinting function, a differential function, a ToF function, a time of arrival function, a time difference of arrival function, an AoD function, a geometric function, etc., or any combination thereof.

The system 100 in the illustrated embodiment of FIGS. 1 and 7-8 may be configured to determine location information about the portable device 20 relative to the object 10. The location information may be indicative of an exterior location of the portable device 20 relative to the object 10, or the location information may be indicative of an interior location of the portable device 20 within the object 10, or a combination thereof. In one embodiment, a locator may be configured to determine this location information. A locator in accordance with one embodiment may be configured to receive one or more inputs, such as one or more signal characteristics of wireless communications transmitted by the portable device 20 and received by one or more sensors 40. The inputs may be translated to one or more outputs corresponding to the location information.

It should be understood that the inputs are not limited to signal characteristics of wireless communications. The inputs may include one or more measurements of characteristics or parameters other than wireless communications. Additionally, or alternatively, the inputs may be indicative of a state of the object 10 or another device in the system 100. For instance, in the context of a vehicle, one or more of the inputs may indicate that one or more of the vehicle doors are open or closed, or whether a window is open or closed.

The locator may be incorporated into an object device of the object system 50. For instance, the controller 58 of the object device may incorporate the locator, and be communicatively coupled to one or more of the sensors 40 via the communication interface 53.

The locator may include a core function or locator algorithm that is configured to receive the one or more inputs and to generate the one or more outputs indicative of a location of the portable device 20 relative to the object 10. As discussed herein, the one or more inputs may vary from application to application. Examples of inputs include one or more signal characteristics of the communications, such as signal strength (RSSI), AoA and ToF.

The locator in one embodiment may translate the signal characteristic obtained from a sensor 40 or the object device to a distance metric or other parameter in a variety of ways, including, for instance, a translation table for each fixed position device or type of fixed position devices, fingerprinting or other heuristic (e.g., a machine learned translator).

In one embodiment, the locator may utilize trilateration or multilateration based on one or more signal characteristics (e.g., signal strength) as a basis for determining a location of a portable device 20. It should be noted that the present disclosure is not limited to trilateration or multilateration as part of the locator algorithm; a variety of additional or alternative functions may form part of the locator algorithm, as discussed herein, including a distance function, a triangulation function, a fingerprinting function, a differential function, a ToF function, a time of arrival function, a time difference of arrival function, an AoD function, a geometric function, heuristics, a machine learning model etc., or any combination thereof.

The locator algorithm of the locator may be tunable according to a plurality of parameters of the locator. Based on the one or more inputs and the values of the plurality of parameters, the locator algorithm may provide an output indicative of a location of the portable device 20 relative to the object 10. The locator algorithm may vary from application to application.

In one example, the locator algorithm may be a neural network (e.g., a convolutional neural network with one or more layers), and the one or more parameters may include weights of nodes within the neural network. The weights may be adjusted during training of the locator with samples obtained from a portable device 20 and the object 10 and truth information obtained with respect to the samples.

In a vehicle, there may be many antennas in accordance with one embodiment of the system 100, where each of the antennas may be in a different location with a different orientation. All or a subset of the antennas and associated devices, such as the object device or the sensor 40, may obtain RSSI, AoA, ToF, or other, or any combination thereof, measurements simultaneously.

Because a variety of factors can affect one or more signal characteristics of communications between the receiver and transmitter, to facilitate tuning the locator and the locator algorithm, samples may be obtained for the one or more signal characteristics under a variety of conditions.

Example variations in conditions can include purposefully rotating the portable device 20 in all directions, as well as obtaining test samples at different heights to ground, to force testing or obtaining samples to cover a large percentage of all possible angles/orientations.

Directional terms, such as vertical, horizontal, top, bottom, upper, lower, inner, inwardly, outer and outwardly, are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles a, an, the or said, is not to be construed as limiting the element to the singular. Any reference to claim elements as at least one of X, Y and Z is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for communicating with a plurality of portable devices, said system comprising:
   a first device operable to communicate with a first portable device via first communication circuitry operable to communicate according to a primary communications interface, the primary communications interface being a wireless communication interface defined by a communication schedule and connection parameters, wherein the plurality of portable devices includes the first portable device;
   a second device operable to communicate with a second portable device via second communication circuitry operable to communicate according to the primary communications interface, wherein the plurality of portable devices includes the second portable device, wherein the primary communications interface is shared by the first and second devices;
   a communication supervisor configured to direct the first device and the second device to communicate via the primary communications interface, the communication supervisor configured to communicate the communication schedule and the connection parameters to the first and second devices so that the first and second devices share the primary communications interface, the first device and second device communicate respectively with the first and second portable devices via the primary communication interface at at least one of different channels and different times in accordance with the communication schedule and connection parameters.

2. The system of claim 1 comprising a locator operable to determine a location of the first portable device relative to the object based on one or more sensed characteristics obtained with respect to communications conducted via the primary communications interface.

3. The system of claim 1 wherein a sensed characteristic is obtained by each of the first and second device based on communications associated with the primary communications interface.

4. The system of claim 1 wherein the communication supervisor directs the first device to conduct communications via the primary communications interface at a time different from communications conducted by the second device via the primary communications interface.

5. The system of claim 1 wherein:
the first device is operable to communicate via the primary communications interface with a first plurality of portable devices from among the plurality of portable devices;
the first plurality of portable devices including the first portable device;
the second device operable to communicate via the primary communications interface with a second plurality of portable devices from among the plurality of portable devices; and
the second plurality of portable devices including the second portable device.

6. The system of claim 5 wherein sensed characteristic of communications is obtained based on communications conducted via the primary communications interface, wherein the sensed characteristic pertains to a time of flight of communications respectively transmitted between the first and second portable devices and the first and second devices.

7. The system of claim 6 wherein:
communications transmitted by the first device via the primary communications interface are transmitted via a first plurality of communication channels; and
communications transmitted by the second device via the primary communications interface are transmitted via a second plurality of communication channels.

8. The system of claim 1 wherein the primary communications interface pertains to Ultrawide band communications.

9. The system of claim 7 wherein the primary communications interface pertains to Bluetooth communications.

10. The system of claim 1 wherein:
the first device communicates with the communication supervisor via a first auxiliary communication interface; and
the second device communicates with the communication supervisor via a second auxiliary communication interface.

11. The system of claim 10 wherein the first and second auxiliary communication interfaces share a communication medium.

12. The system of claim 1 wherein the first and second devices, via coordination of the primary communications interface, appear as a single device to the plurality of portable devices.

13. The system of claim 1 wherein the first device includes the communication supervisor.

14. A system for communicating with a plurality of portable devices, said system comprising:
a first device operable to communicate with a first portable device via first communication circuitry operable to communicate according to a primary communications interface;
a second device operable to communicate with a second portable device via second communication circuitry operable to communicate according to the primary communications interface;
a communication supervisor configured to direct communications for the first and second devices, the communication supervisor configured to communicate a communication schedule and connection parameters to the first and second devices so that the first and second devices share the primary communications interface, the first device and second device communicate respectively with the first and second portable devices via the primary communications interface at at least one of different channels and different times in accordance with the communication schedule and connection parameters; and
a locator operable to determine location information about the first portable device based on one or more first sensed characteristics obtained with respect to communications transmitted according to the primary communications interface, the locator operable to determine location information about the second portable device based on one or more second sensed characteristics obtained with respect to communications transmitted according to the primary communications interface.

15. The system of claim 14 wherein the communication supervisor is configured to direct the first controller device and the second controller device to communicate via the primary communications interface.

16. The system of claim 14 wherein the first device includes the communication supervisor.

17. The system of claim 14 wherein the first and second devices, via coordination of the primary communications interface, appear as a single device to the plurality of portable devices.

18. The system of claim 14 wherein the primary communications interface is configured for Ultrawide band communications or Bluetooth communications.

* * * * *